United States Patent
Park et al.

(10) Patent No.: US 9,715,287 B2
(45) Date of Patent: Jul. 25, 2017

(54) IMAGE DISPLAY APPARATUS AND METHOD FOR OPERATING THE SAME

(71) Applicant: LG ELECTRONICS INC., Seoul (KR)

(72) Inventors: Sunghee Park, Seoul (KR); Kwangsoo Choi, Seoul (KR); Seunghun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 13/732,564

(22) Filed: Jan. 2, 2013

(65) Prior Publication Data

US 2013/0201103 A1    Aug. 8, 2013

Related U.S. Application Data

(60) Provisional application No. 61/582,616, filed on Jan. 3, 2012.

(51) Int. Cl.
  *G06F 3/033* (2013.01)
  *G06F 3/038* (2013.01)
  (Continued)

(52) U.S. Cl.
  CPC ....... *G06F 3/038* (2013.01); *H04N 21/42204* (2013.01); *H04N 21/42207* (2013.01); *H04N 21/42225* (2013.01); *G06F 3/0346* (2013.01)

(58) Field of Classification Search
  CPC ........ G06F 3/011; G06F 3/017; G06F 3/0338; G06F 3/03542; G06F 3/0346;
  (Continued)

(56) References Cited

U.S. PATENT DOCUMENTS

2006/0184966 A1\* 8/2006 Hunleth ................. G06F 3/017
    725/39
2008/0186411 A1   8/2008 Kondo et al. ............. 348/734
    (Continued)

FOREIGN PATENT DOCUMENTS

CN    101981940    2/2011
EP    2 259 603 A1    8/2010
    (Continued)

OTHER PUBLICATIONS

International Search Report dated Apr. 24, 2013 issued in Application No. PCT/KR2012/011791.
(Continued)

*Primary Examiner* — Kent Chang
*Assistant Examiner* — Mark Edwards

(57) ABSTRACT

A method for operating an image display apparatus includes receiving a pairing request signal from a first remote controller, performing pairing with the first remote controller, receiving a pairing request signal from a second remote controller, confirming attributes of content which is being used, and determining whether pairing with the second remote controller is performed based on the confirmed attributes of the content. An image display apparatus includes an interface configured to receive a pairing request signal from a remote controller, a display configured to display predetermined content, and a controller configured to receive a pairing request signal from a second remote controller in a state of performing pairing with a first remote controller and to determine whether pairing with the second remote controller is performed based on attributes of the predetermined content. Accordingly, user convenience can be increased by variously and conveniently using the plurality of remote controllers.

14 Claims, 24 Drawing Sheets

(51) Int. Cl.
*H04N 21/422* (2011.01)
*G06F 3/0346* (2013.01)

(58) Field of Classification Search
CPC ...... G06F 3/0362; G06F 3/033; G06F 3/0308;
G06F 3/048; G08C 2201/20; G08C
2201/92; G08C 2201/93; H04N 5/4403;
H04N 5/44582; H04N 21/4316; H04N
21/42204; H04N 2005/4442; H04N 5/45;
H03J 9/00; H03J 9/02; H03J 9/06
USPC ............................. 345/156, 157, 158; 348/974
See application file for complete search history.

(56) References Cited

U.S. PATENT DOCUMENTS

| | | | |
|---|---|---|---|
| 2008/0312512 A1* | 12/2008 | Brukalo | A61B 5/0002 600/300 |
| 2009/0023389 A1 | 1/2009 | Paryani | 455/41.2 |
| 2010/0033549 A1 | 2/2010 | Sato | |
| 2010/0241998 A1* | 9/2010 | Latta | G06F 3/017 715/862 |
| 2010/0302190 A1* | 12/2010 | Yeh | G06F 1/1626 345/173 |
| 2010/0331082 A1 | 12/2010 | Kim et al. | |
| 2011/0018754 A1* | 1/2011 | Tojima | G08C 17/00 341/176 |
| 2011/0102321 A1* | 5/2011 | Son | 345/158 |
| 2011/0185437 A1* | 7/2011 | Tran | H04L 63/104 726/28 |
| 2011/0265118 A1* | 10/2011 | Choi | H04N 5/4401 725/37 |
| 2011/0273625 A1 | 11/2011 | McMahon et al. | 348/734 |
| 2011/0298909 A1* | 12/2011 | Ando | A63F 13/06 348/77 |

FOREIGN PATENT DOCUMENTS

| | | |
|---|---|---|
| JP | 2010-074607 A | 4/2010 |
| KR | 10-2011-0050148 A | 5/2011 |

OTHER PUBLICATIONS

European Search Report dated Oct. 12, 2015 issued in Application No. 12864125.5.
Chinese Office Action dated Nov. 18, 2016 issued in Application No. 201280070994.3 (English translation attached).

* cited by examiner

FIG. 7
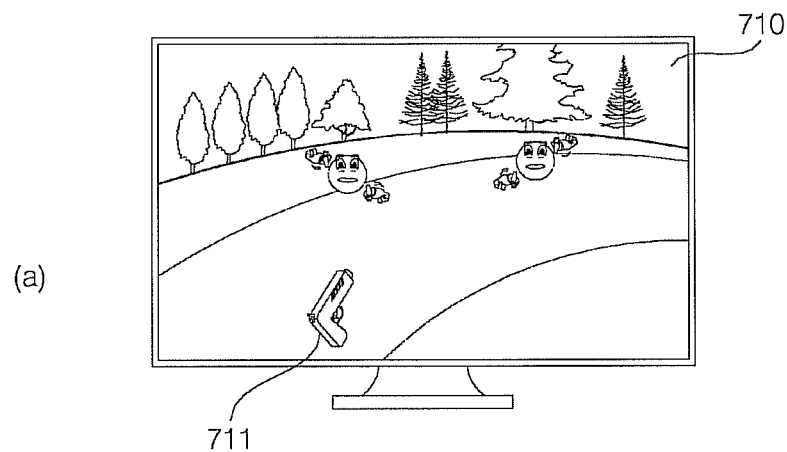
(a)
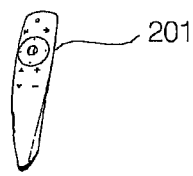
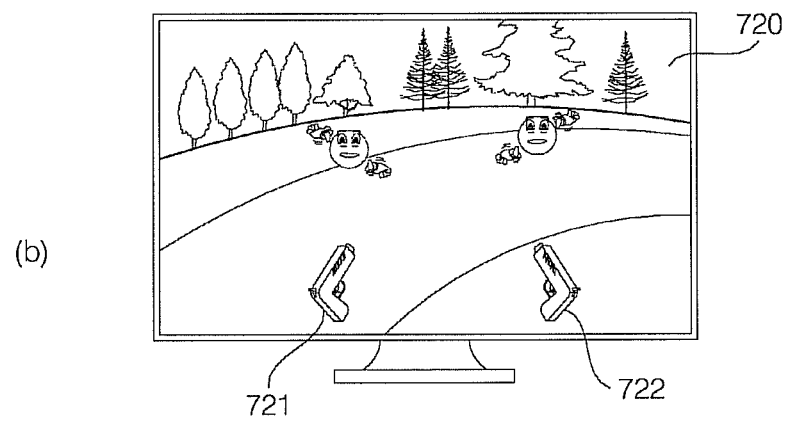
(b)
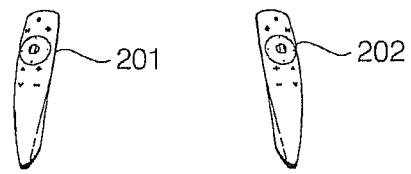

FIG. 8
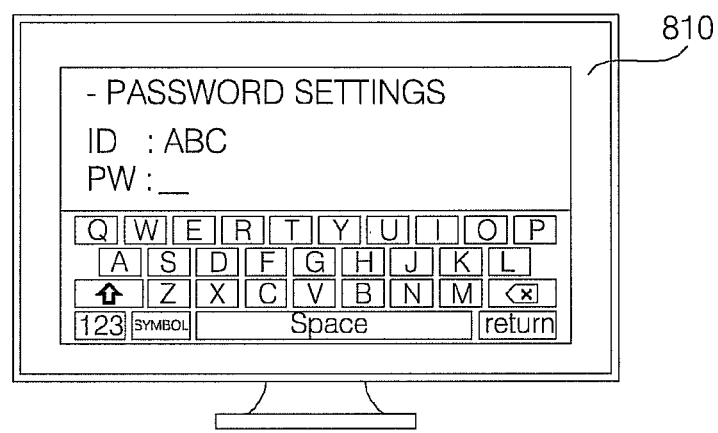
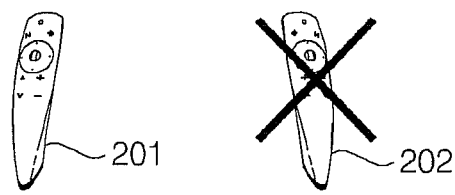

FIG. 9
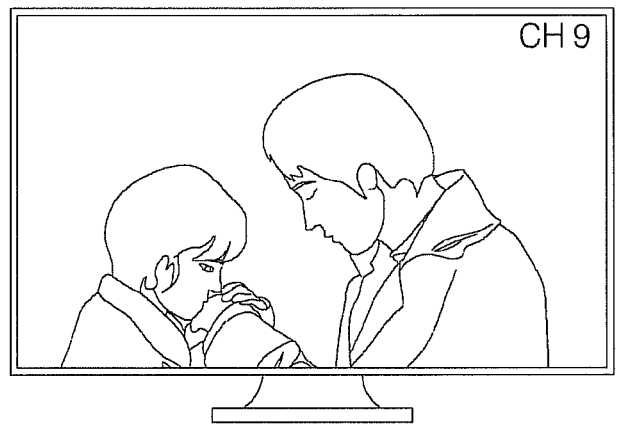
(a)
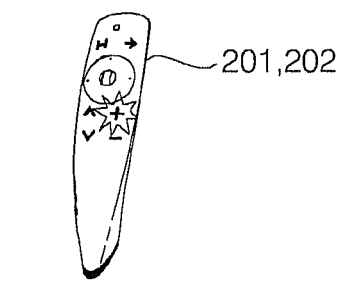
201,202
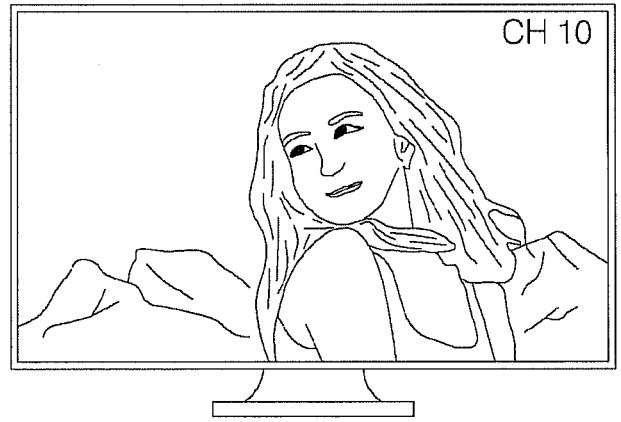
(b)

FIG. 11b
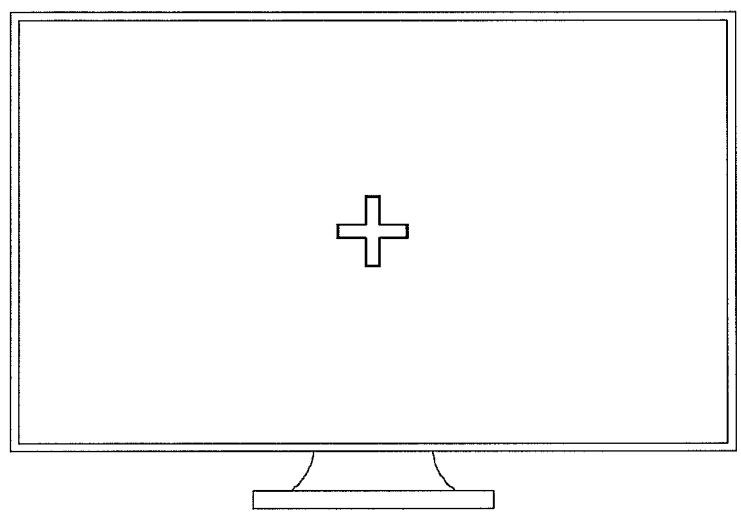
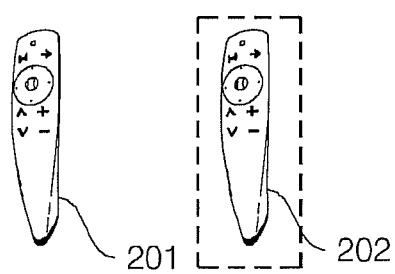

FIG. 11c
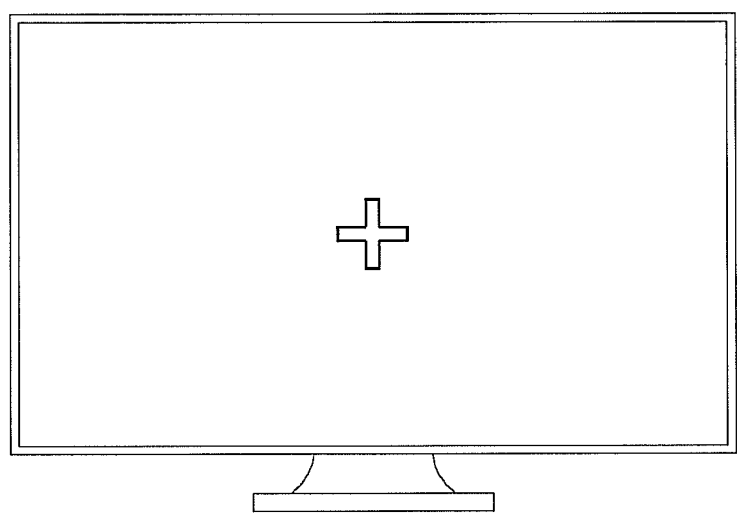
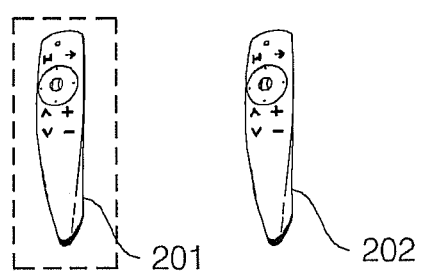

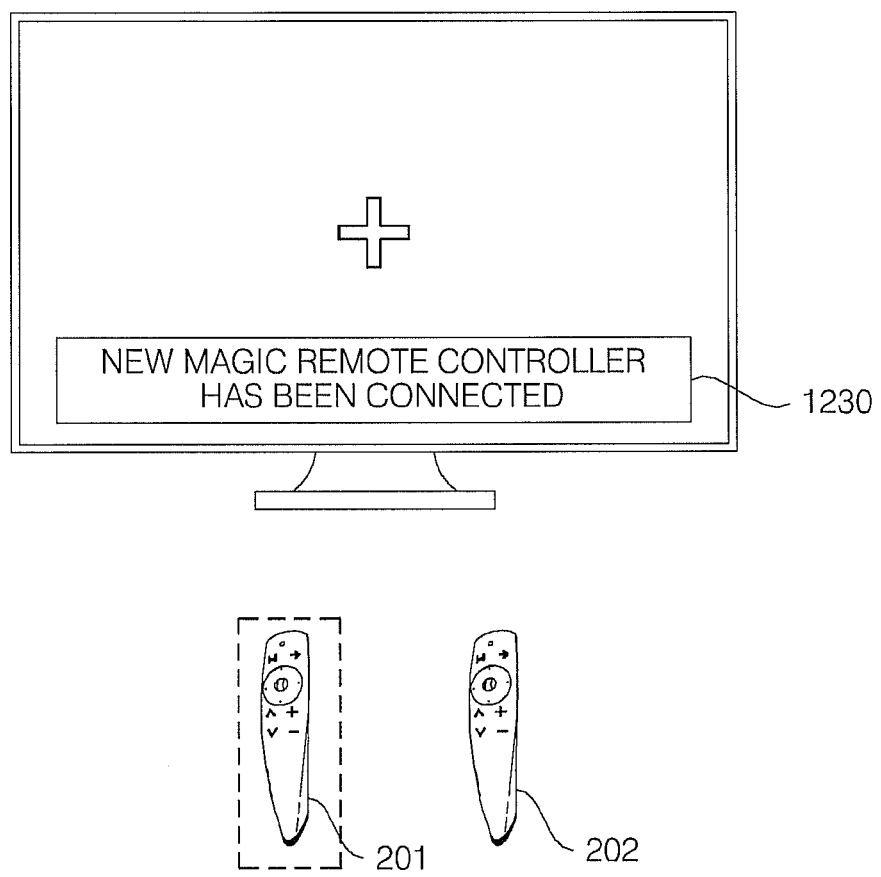

FIG. 13d
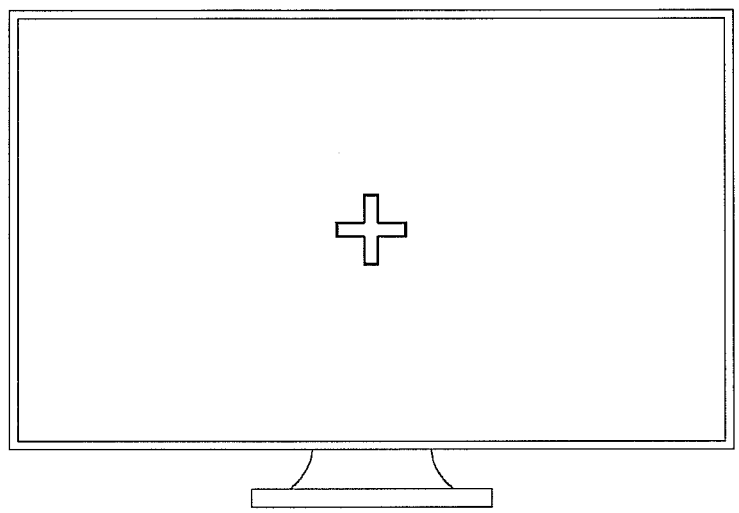
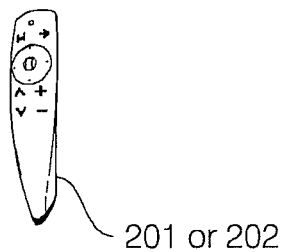
201 or 202

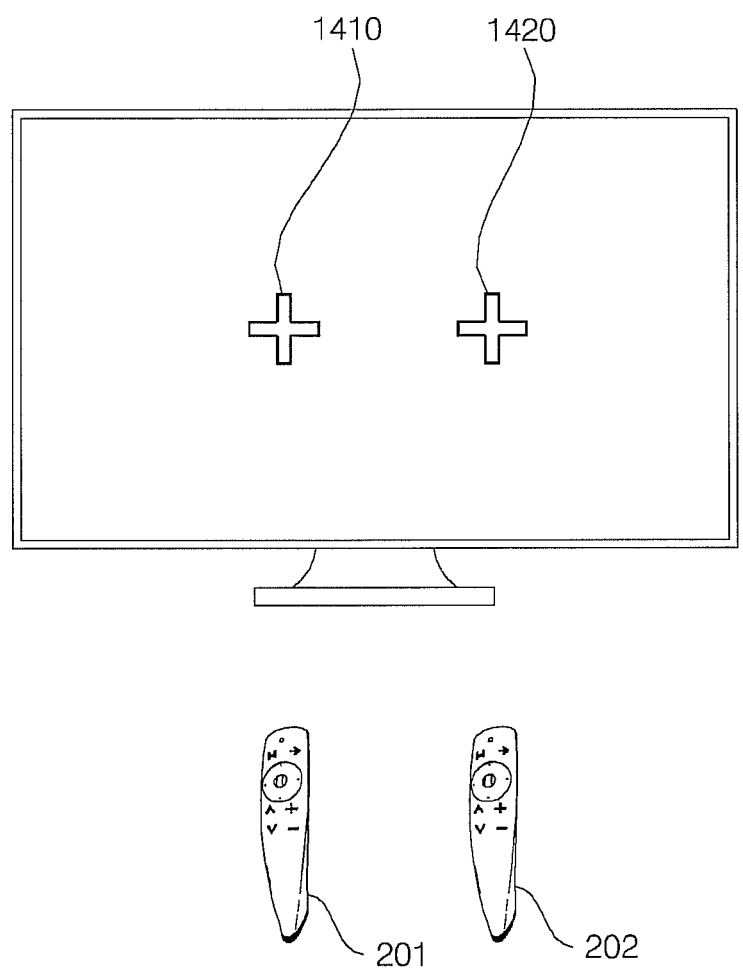

FIG. 15
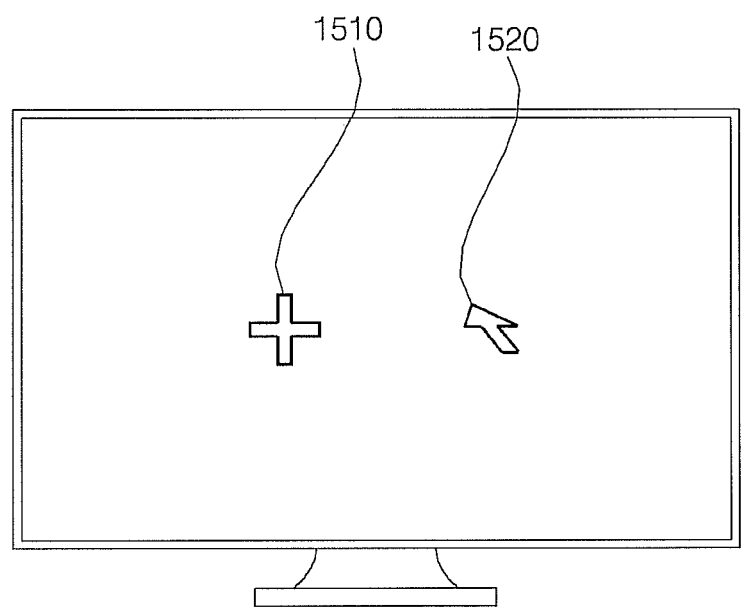
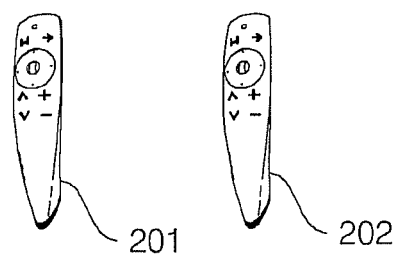

US 9,715,287 B2

IMAGE DISPLAY APPARATUS AND METHOD FOR OPERATING THE SAME

CROSS-REFERENCE TO RELATED APPLICATION

This application claims the priority benefit of U.S. Provisional Patent Application No. 61/582,616, filed on Jan. 3, 2012 in the USPTO, the disclosure of which is incorporated herein by reference.

BACKGROUND OF THE INVENTION

1. Field of the Invention

The present invention relates to an image display apparatus and a method for operating the same, and more particularly to an image display apparatus which is capable of efficiently and conveniently performing pairing with a plurality of remote controllers so as to increase user convenience, and a method for operating the same.

2. Description of the Related Art

An image display apparatus functions to display images to a user. A user can view a broadcast program using an image display apparatus. The image display apparatus can display a broadcast program selected by the user on a display from among broadcast programs transmitted from broadcasting stations. The recent trend in broadcasting is a worldwide transition from analog broadcasting to digital broadcasting.

Digital broadcasting transmits digital audio and video signals. Digital broadcasting offers many advantages over analog broadcasting, such as robustness against noise, less data loss, ease of error correction, and the ability to provide clear, high-definition images. Digital broadcasting also allows interactive viewer services, compared to analog broadcasting.

In order to operate an image display apparatus, a remote controller is used. As operations executed in an image display apparatus have been variously changed, various functions of the remote controller have been further required. Accordingly, in an image display apparatus using a remote controller, various methods for increasing user convenience have been researched.

SUMMARY OF THE INVENTION

Therefore, the present invention has been made in view of the above problems, and it is an object of the present invention to provide an image display apparatus which is capable of increasing user convenience, and a method for operating the same.

Another object of the present invention is to provide an image display apparatus which is capable of efficiently operating by performing pairing with a plurality of remote controllers using various methods according to circumstances and granting control rights to the plurality of remote controllers, and a method for operating the same.

In accordance with an aspect of the present invention, the above and other objects can be accomplished by the provision of a method for operating an image display apparatus including receiving a pairing request signal from a first remote controller, performing pairing with the first remote controller, receiving a pairing request signal from a second remote controller, confirming attributes of content which is being used, and determining whether pairing with the second remote controller is performed based on the confirmed attributes of the content.

In accordance with another aspect of the present invention, there is provided an image display apparatus including an interface configured to receive a pairing request signal from a remote controller, a display configured to display predetermined content, and a controller configured to receive a pairing request signal from a second remote controller in a state of performing pairing with a first remote controller and to determine whether pairing with the second remote controller is performed based on attributes of the predetermined content.

According to the embodiments of the present invention, it is possible to determine whether pairing with a plurality of remote controllers is performed according to attributes of content which is being used and to grant control rights to the plurality of remote controllers. Accordingly, it is possible to increase user convenience by variously and conveniently using the plurality of remote controllers.

BRIEF DESCRIPTION OF THE DRAWINGS

The above and other objects, features and other advantages of the present invention will be more clearly understood from the following detailed description taken in conjunction with the accompanying drawings, in which:

FIGS. 7 to 15 are views referred to for describing various examples of the method for operating the image display apparatus according to various embodiments of the present invention.

DETAILED DESCRIPTION OF THE PREFERRED EMBODIMENTS

Exemplary embodiments of the present invention will be described with reference to the attached drawings.

The terms "module" and "unit" attached to describe the names of components are used herein to aid in understanding of the components and thus should not be constructed as having specific meanings or roles. Accordingly, the terms "module" and "unit" may be used interchangeably.

Figure 1:
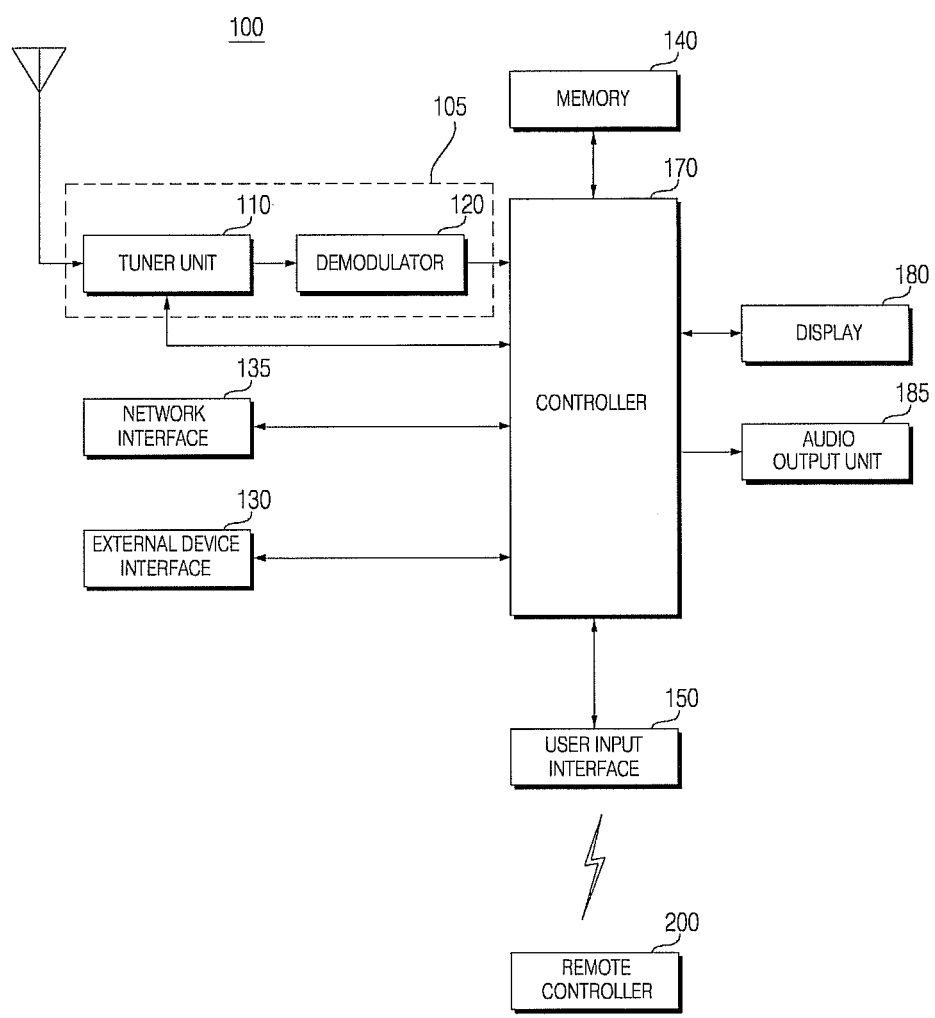
FIG. 1 is a block diagram showing the internal configuration of an image display apparatus according to an embodiment of the present invention.

FIG. 1 is a block diagram showing the internal configuration of the image display apparatus according to an embodiment of the present invention.

Referring to FIG. 1, the image display apparatus 100 according to the embodiment of the present invention includes a broadcast reception unit 105, an external device interface 130, a memory 140, a user input interface 150, a sensor unit (not shown), a controller 170, a display 180 and an audio output unit 185.

The broadcast reception unit 105 may include a tuner unit 110, a demodulator 120 and a network interface 135. As needed, the broadcast reception unit 105 may include only the tuner unit 110 and the demodulator 120 or only the network interface 135.

The tuner unit 110 tunes to a Radio Frequency (RF) broadcast signal corresponding to a channel selected by a user from among RF broadcast signals received through an antenna or RF broadcast signals corresponding to all channels previously stored in the image display apparatus. The tuned RF broadcast is converted into an Intermediate Frequency (IF) signal or a baseband Audio/Video (AV) signal.

For example, the tuned RF broadcast signal is converted into a digital IF signal DIF if it is a digital broadcast signal and is converted into an analog baseband AV signal (Composite Video Banking Sync/Sound Intermediate Frequency (CVBS/SIF)) if it is an analog broadcast signal. That is, the tuner unit 110 may process a digital broadcast signal or an analog broadcast signal. The analog baseband AV signal (CVBS/SIF) output from the tuner unit 110 may be directly input to the controller 170.

The tuner unit 110 may be capable of receiving RF broadcast signals from an Advanced Television Systems Committee (ATSC) single-carrier system or from a Digital Video Broadcasting (DVB) multi-carrier system.

The tuner unit 110 may sequentially select a number of RF broadcast signals corresponding to all broadcast channels previously stored in the image display apparatus by a channel storage function from a plurality of RF signals received through the antenna and may convert the selected RF broadcast signals into IF signals or baseband A/V signals.

The tuner unit 110 may include a plurality of tuners in order to receive broadcast signals of a plurality of channels. Alternatively, the tuner unit may include a single tuner for simultaneously receiving broadcast signals of a plurality of channels.

The demodulator 120 receives the digital IF signal DIF from the tuner unit 110 and demodulates the digital IF signal DIF.

The demodulator 120 may perform demodulation and channel decoding, thereby obtaining a stream signal TS. The stream signal may be a signal in which a video signal, an audio signal and a data signal are multiplexed.

The stream signal output from the demodulator 120 may be input to the controller 170 and thus subjected to demultiplexing and A/V signal processing. The processed video and audio signals are output to the display 180 and the audio output unit 185, respectively.

The external device interface 130 may serve to transmit or receive data to or from an external device (not shown) connected thereto. For interfacing, the external device interface 130 may include an A/V Input/Output (I/O) unit (not shown) and/or a wireless communication module (not shown).

The external device interface 130 may be connected to an external device such as a Digital Versatile Disc (DVD) player, a Blu-ray player, a game console, a camera, a camcorder, or a computer (e.g., a laptop computer), wirelessly or by wire so as to perform an input/output operation with respect to the external device.

The A/V I/O unit externally receives video and audio signals from the external device. The wireless communication unit may perform short-range wireless communication with another electronic apparatus.

The network interface 135 serves as an interface between the image display apparatus 100 and a wired/wireless network such as the Internet. The network interface 135 may receive content or data provided by an Internet or content provider or a network operator over a network.

The network interface 135 performs data communication with an electronic apparatus located near the image display apparatus 100. At this time, the network interface 135 may receive apparatus information of another electronic apparatus or remote controllable channel information, frequency information or code information of another electronic apparatus.

The memory 140 may store various programs necessary for the controller 170 to process and control signals, and may also store processed video, audio and data signals.

The memory 140 may temporarily store a video, audio and/or data signal received from the external device interface 130. The memory 140 may store information about a predetermined broadcast channel by the channel storage function of a channel map.

In addition, the memory 140 may store infrared (IR) format key codes for controlling other electronic apparatuses as IR signals and store an IR format key database of a plurality of electronic apparatuses.

While the memory 140 is shown in FIG. 1 as being configured separately from the controller 170, to which the present invention is not limited, the memory 140 may be incorporated into the controller 170.

The user input interface 150 transmits a signal input by the user to the controller 170 or transmits a signal received from the controller 170 to the user.

For example, the user input interface 150 may transmit/receive various user input signals such as a power-on/off signal, a channel selection signal, and a screen setting signal from a remote controller 200, may provide the controller 170 with user input signals received from local keys (not shown), such as inputs of a power key, a channel key, and a volume key, and setting values, or provide the controller 170 with a user input signal received from a sensor unit (not shown) for sensing a user gesture, or transmit a signal received from the controller 170 to a sensor unit (not shown).

According to an embodiment of the present invention, the user input interface 150 may receive personal information from the remote controller 200. The user input interface 150 may further receive information about a web server accessed using the personal information in addition to the personal information.

For example, if a mobile terminal 300 and the remote controller 200 are within a predetermined distance of each other to perform a near field communication (NFC), the remote controller 200 may receive the personal information stored in the mobile terminal 300. The remote controller 200 may transmit the personal information to the image display apparatus 100 according to an IR method or an radio frequency (RF) method. At this time, the user input interface 150 sends the received personal information to the controller 170.

The personal information may include personal ID information, password information, personal email information, etc. of the mobile terminal 300. Alternatively, the personal information may include personal ID information, password information, personal email information, etc. of the image display apparatus 100. Alternatively, the personal information may include personal ID information, password information, etc. of various electronic apparatus, which may be commonly used, including the mobile terminal 300. Alternatively, the personal information may include personal ID information, password information, etc. of a predetermined web server previously stored in the mobile terminal 300. Alternatively, the personal information may include personal ID information, password information, etc. of a predetermined server web which may be used in the mobile terminal 300, the image display apparatus 100, etc. Alternatively, the personal information may include personal ID information, password information, etc. of a server connected to the image display apparatus 100.

That is, the personal information may be necessary to log in to an electronic apparatus or service.

The user input interface 150 may receive apparatus information of another electronic apparatus or remote controllable channel information, frequency information or code information of another electronic apparatus from an electronic apparatus located near the image display apparatus 100 through the remote controller 200.

The controller 170 may demultiplex the stream signal received from the tuner unit 110, the demodulator 120, or the external device interface 130 into a number of signals, process the demultiplexed signals into audio and video data, and output the audio and video data.

The video signal processed by the controller 170 may be displayed as an image on the display 180. The video signal processed by the controller 170 may also be transmitted to an external output device through the external device interface 130.

The audio signal processed by the controller 170 may be output to the audio output unit 185. Also, the audio signal processed by the controller 170 may be transmitted to the external output device through the external device interface 130.

While not shown in FIG. 1, the controller 170 may include a DEMUX, a video processor, etc., which will be described in detail later with reference to FIG. 2.

The controller 170 may control the overall operation of the image display apparatus 100. For example, the controller 170 controls the tuner unit 110 to tune to an RF signal corresponding to a channel selected by the user or a previously stored channel.

The controller 170 may control the image display apparatus 100 by a user command input through the user input interface 150 or an internal program.

The controller 170 may control the display 180 to display images. The image displayed on the display 180 may be a Two-Dimensional (2D) or Three-Dimensional (3D) still or moving image.

The controller 170 may generate and display a predetermined object of an image displayed on the display 180 as a 3D object. For example, the object may be at least one of a screen of an accessed website (newspaper, magazine, etc.), an electronic program guide (EPG), various menus, a widget, an icon, a still image, a moving image, text, etc.

The controller 170 recognizes the position of the user based on an image captured by a camera unit (not shown). For example, a distance (z-axis coordinate) between the user and the image display apparatus 100 may be detected. An x-axis coordinate and a y-axis coordinate in the image display apparatus 100 corresponding to the position of the user may be detected.

According to an embodiment of the present invention, the controller 170 may control login based on the personal information received from the remote controller 200. At this time, login may be login of the image display apparatus 100, login of a server connected to the image display apparatus 100, or login of a predetermined web server to which a user subscribes using personal information thereof.

For example, if the user logs in to the image display apparatus 100 using personal ID information and password information received from the remote controller 200, the controller 170 may control the display 180 to display a personal screen of the user set according to a user account. If there is an image which is being viewed, the controller 170 may control the display 180 to display a personal setting screen along with the image which is being viewed. Alternatively, the controller 170 may switch the image which is being viewed to a personal setting screen.

As another example, if the user logs in to the server connected to the image display apparatus 100, the controller 170 may control the display 180 to display a server access screen received from the server. More specifically, the screen may be an app server screen. If there is an image which is being viewed, the controller 170 may control the display 180 to display a server access screen along with the image which is being viewed. Alternatively, the controller 170 may switch the image which is being viewed to a server access screen.

As another example, if the received personal information is personal information of another electronic apparatus and, more particularly, a predetermined web server accessed by the mobile terminal 300, the controller 170 may control the image display apparatus 100 to access the web server and control the display 180 to display a screen of the accessed web server. This web server may provide a social network service. If there is an image which is being viewed, the controller 170 may control the display 180 to display the screen of the accessed web server along with the image which is being viewed. Alternatively, the controller 170 may switch the image which is being viewed to the screen of the accessed web server.

The controller 170 may control a power supply (not shown) for supplying power to the image display apparatus 100 if the image display apparatus 100 is in an off state when the personal information is received. That is, if the user input interface 150 receives the personal information in a standby mode, the controller 170 may switch the standby mode to a wakeup mode and control the power supply to supply power to various modules or units.

The controller 170 may determine whether each electronic apparatus is connected according to the personal information from the remote controller 200 based on apparatus information of another electronic apparatus located near the image display apparatus 100 or remote controllable channel information, frequency information or code information of another electronic apparatus, which is received from the network interface 135 or the user input interface 150, and control the display 180 to display an object indicating that another electronic apparatus has been logged in.

Alternatively, the controller 170 may control transmission of apparatus information, channel information, frequency information and code information to the remote controller 200, based on apparatus information of another electronic apparatus located near the image display apparatus 100 or remote controllable channel information, frequency information or code information of another electronic apparatus.

Although not shown, a channel browsing processor for generating a thumbnail image corresponding to a channel signal or an external input signal may be further included. The channel browsing processor may receive the stream signal TS output from the demodulator 120 or the stream signal output from the external device interface 130, extract an image from the received stream signal, and generate a thumbnail image. The generated thumbnail image may be decoded into a stream form to be input to the controller 170 together with the decoded image. The controller 170 may display a thumbnail list including a plurality of thumbnail images on the display 180 using the input thumbnail image.

The thumbnail list may be displayed in a brief viewing method of displaying the thumbnail list in a part of an area in a state of displaying a predetermined image or may be displayed in a full viewing method of displaying the thumbnail list in a full area. The thumbnail images in the thumbnail list may be sequentially updated.

The display 180 converts the video signal, the data signal, the OSD signal and the control signal processed by the controller 170 or the video signal, the data signal and the control signal received by the external device interface 130 and generates a drive signal.

The display 180 may be a Plasma Display Panel (PDP), a Liquid Crystal Display (LCD), an Organic Light-Emitting Diode (OLED) display or a flexible display. In particular, the display 180 may be a 3D display.

If the display 180 is a touchscreen, the display 180 may function as not only an output device but also as an input device.

The audio output unit 185 receives the audio signal processed by the controller 170 and outputs the received audio signal as sound.

The camera unit (not shown) captures images of a user. The camera unit (not shown) may be implemented by one camera, but the present invention is not limited thereto. That is, the camera unit may be implemented by a plurality of cameras. The camera unit (not shown) may be embedded in the image display apparatus 100 at the upper side of the display 180 or may be separately provided. Image information captured by the camera unit (not shown) may be input to the controller 170.

The controller 170 may sense a user gesture from an image captured by the camera unit (not shown), a signal sensed by the sensor unit (not shown), or a combination of the captured image and the sensed signal.

The remote controller 200 transmits user input to the user input interface 150. For transmission of user input, the remote controller 200 may use various communication techniques such as Bluetooth, RF communication, IR communication, Ultra Wideband (UWB), ZigBee and near field communication (NFC).

In addition, the remote controller 200 may receive a video signal, an audio signal or a data signal from the user input interface 15. The remote controller 200 output the received signals visually or audibly based on the received video, audio or data signal.

The remote controller 200 according to the embodiment of the present invention may receive information by near field communication with a predetermined electronic apparatus. The information may include personal ID information and password information which may be used in the mobile terminal, the image display apparatus or the electronic apparatus, as described above.

The remote controller 200 may transmit the received personal information to the image display apparatus 100. As this time, an IR method or an RF method may be used as the communication method.

In the embodiment of the present invention, it is assumed that the remote controller 200 is a pointing device for displaying a pointer corresponding to user motion. That is, the remote controller 200 may transmit personal information to the image display apparatus 100 using an RF method.

The remote controller 200 may further receive information about a web server accessed using the personal information in addition to the personal information. For example, the remote controller 200 may receive web server information of a social network service which is being logged in to and accessed by the mobile terminal. Such web server information is also transmitted to the image display apparatus 100.

The remote controller 200 may receive apparatus information of another electronic apparatus or remote controllable channel information, frequency information or code information of another electronic apparatus from an electronic apparatus located near the image display apparatus 100. Based on the information about another electronic apparatus, a channel, frequency or code may be allocated to the electronic apparatus so as to perform remote control.

The above-described image display apparatus 100 may be a fixed or mobile digital broadcast receiver capable of receiving a digital broadcast.

The block diagram of the image display apparatus 100 illustrated in FIG. 1 is only exemplary. Depending upon the specifications of the image display apparatus 100 in actual implementation, the components of the image display apparatus 100 may be combined or omitted or new components may be added. That is, two or more components may be incorporated into one component or one component may be configured as separate components, as needed. In addition, the function of each block is described for the purpose of describing the embodiment of the present invention and thus specific operations or devices should not be construed as limiting the scope and spirit of the present invention.

Unlike FIG. 1, the image display apparatus 100 may not include the tuner unit 110 and the demodulator 120 shown in FIG. 1 and may receive broadcast content via the network interface 135 or the external device interface 135 and play the broadcast content back.

Figure 2:
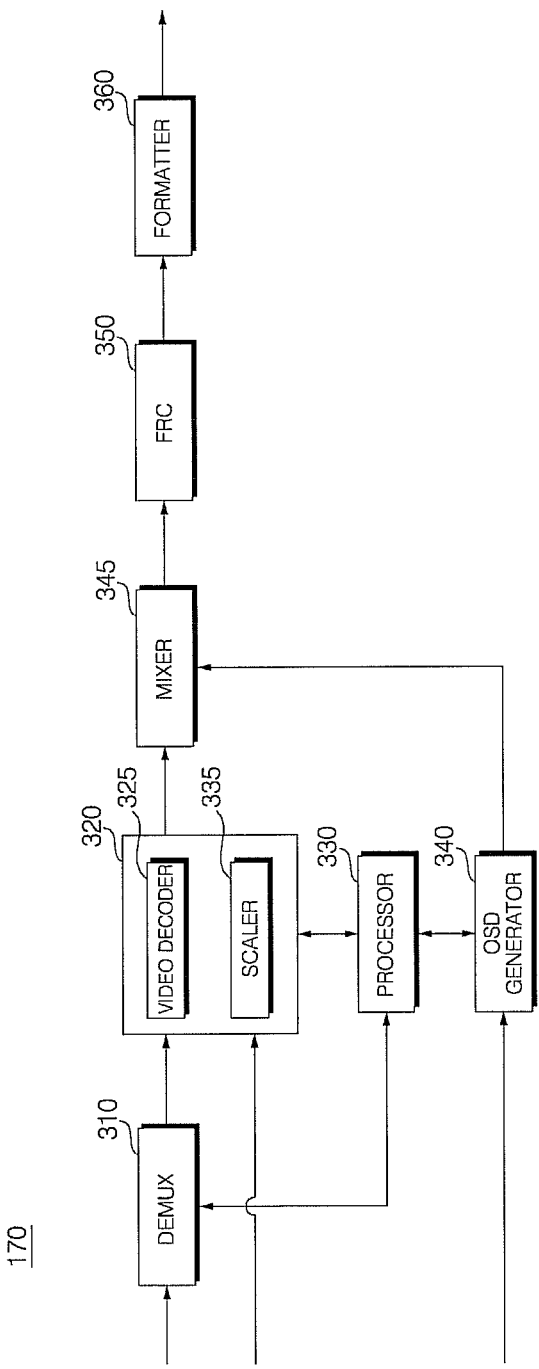
FIG. 2 is a block diagram showing the internal configuration of a controller of FIG. 1.

FIG. 2 is a block diagram showing the internal configuration of the controller illustrated in FIG. 1.

Referring to FIG. 2, the controller 170 according to the embodiment of the present invention may include a DEMUX 310, a video processor 320, a processor 330, an OSD generator 340, a mixer 345, a Frame Rate Converter (FRC) 350, and a formatter 360. The controller 170 may further include an audio processor (not shown) and a data processor (not shown).

The DEMUX 310 demultiplexes an input stream. For example, the DEMUX 310 may demultiplex an MPEG-2 TS into a video signal, an audio signal, and a data signal. The stream signal input to the DEMUX 310 may be received from the tuner unit 110, the demodulator 120 or the external device interface 135.

The video processor 320 may process the demultiplexed video signal. For video signal processing, the video processor 320 may include a video decoder 325 and a scaler 335.

The video decoder 325 decodes the demultiplexed video signal and the scaler 335 scales the resolution of the decoded video signal so that the video signal can be displayed on the display 180.

The video decoder 325 may be provided with decoders that operate based on various standards.

The processor 330 may control the overall operation of the image display apparatus 100 or the controller 170. For example, the processor 330 controls the tuner unit 110 to tune to an RF signal corresponding to a channel selected by the user or a previously stored channel.

The processor 330 may control overall operation of the image display apparatus 100 or the controller 170. For example, the processor 330 may control the tuner unit 110 to tune to an RF broadcast corresponding to an RF signal corresponding to a channel selected by the user or a previously stored channel.

The processor 330 may control the image display apparatus 100 by a user command input through the user input interface 150 or an internal program.

The processor 330 may control data transmission of the network interface 135 or the external device interface 130.

The processor 330 may control the operation of the DEMUX 310, the video processor 320 and the OSD generator 340 of the controller 170.

The OSD generator 340 generates an OSD signal autonomously or according to user input. For example, the OSD generator 340 may generate signals by which a variety of information is displayed as graphics or text on the display 180, according to user input signals. The OSD signal may include various data such as a User Interface (UI), a variety of menus, widgets, icons, etc. Also, the OSD signal may include a 2D object and/or a 3D object.

The OSD generator 340 may generate a pointer which can be displayed on the display according to a pointing signal received from the remote controller 200. In particular, such a pointer may be generated by a pointing signal processor and the OSD generator 340 may include such a pointing signal processor (not shown). Alternatively, the pointing signal processor (not shown) may be provided separately from the OSD generator 340.

In association with the embodiment of the present invention, the OSD generator 340 may generate or configure a set personal screen if the user logs in to the image display apparatus 100. Alternatively, the OSD generator 340 may generate or configure at least a part of a server access screen so as to display a server access screen received from a server on the display 180 if the user logs in to the accessed server. Alternatively, the OSD generator 340 may generate or configure at least a part of a web server access screen based on information about a web server which is being accessed using personal information.

The mixer 345 may mix the decoded video signal processed by the video processor 320 with the OSD signal generated by the OSD generator 340. Each of the OSD signal and the decoded video signal may include at least one of a 2D signal and a 3D signal. The mixed video signal is provided to the FRC 350.

The FRC 350 may change the frame rate of an input image. The FRC 350 may maintain the frame rate of the input image without frame rate conversion.

The formatter 360 changes the format of the signal mixed by the mixer 345, that is, the OSD signal and decoded video signal, to be suitable for the display 180. For example, the formatter 360 may convert a received signal into an RGB data signal. The RGB signal may be output in the form of a Low Voltage Differential Signal (LVDS) or mini-LVDS.

The formatter 360 may separate a 2D video signal and a 3D video signal, for 3D video display. The formatter 360 may change the format of a 3D video signal or convert a 2D video signal into a 3D video signal.

The audio processor (not shown) of the controller 170 may process the demultiplexed audio signal. For audio signal processing, the audio processor may have various decoders.

The audio processor (not shown) of the controller 170 may also adjust the bass, treble or volume of the audio signal.

The data processor (not shown) of the controller 170 may process the demultiplexed data signal. For example, if the demultiplexed data signal was encoded, the data processor may decode the data signal. The encoded data signal may be Electronic Program Guide (EPG) information including broadcasting information such as the start time and end time of broadcast programs of each channel.

Although the formatter 360 performs 3D processing after the signals from the OSD generator 340 and the video processor 320 are mixed by the mixer 345 in FIG. 2, the present invention is not limited thereto and the mixer may be located at a next stage of the formatter.

The block diagram of the controller 170 shown in FIG. 2 is exemplary. The components of the block diagrams may be integrated or omitted, or a new component may be added according to the specifications of the controller 170.

In particular, the FRC 350 and the formatter 360 may be included separately from the controller 170.

Figure 3:
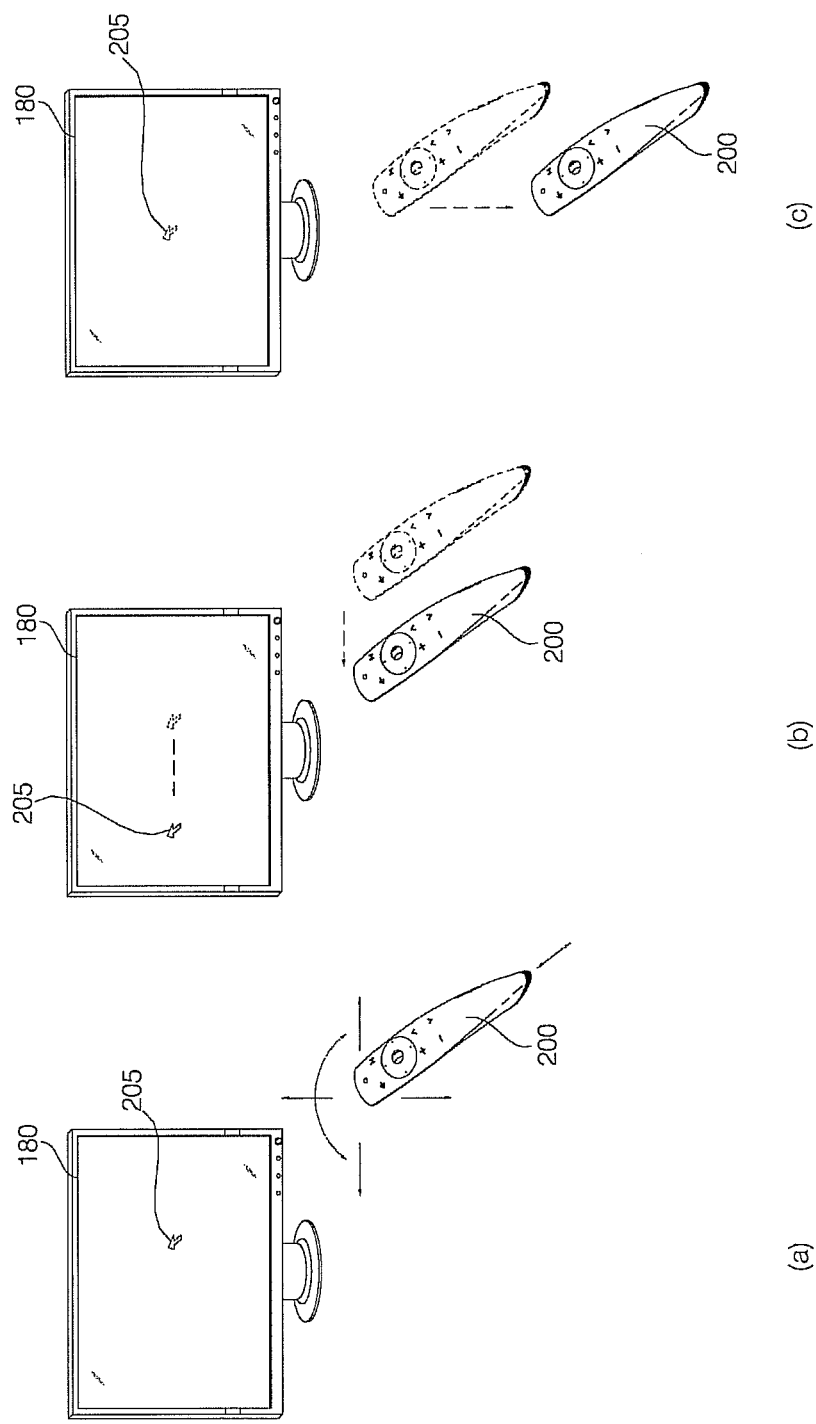
FIG. 3 is a diagram showing a method of controlling a remote controller of FIG. 1.

FIG. 3 is a diagram showing a method of controlling a remote controller of FIG. 1.

FIG. 3(a) illustrates a pointer 205 representing movement of the remote controller 200 displayed on the display 180.

The user may move or rotate the remote controller 200 up and down, side to side (FIG. 3(b)), and back and forth (FIG. 3(c)). The pointer 205 displayed on the display 180 of the image display apparatus corresponds to the movement of the remote controller 200. Since the pointer 205 moves in accordance with the movement of the remote controller 200 in a 3D space, the remote controller 200 may be referred to as a pointing device.

Referring to FIG. 3(b), if the user moves the remote controller 200 to the left, the pointer 205 moves to the left on the display 180 of the image display apparatus.

Information about the movement of the remote controller 200 sensed by the sensor of the remote controller 200 is transmitted to the image display apparatus. The image display apparatus may calculate the coordinates of the pointer 205 from the information about the movement of the remote controller 200. Then, the image display apparatus may display the pointer 205 at the calculated coordinates.

Referring to FIG. 3(c), while pressing a predetermined button of the remote controller 200, the user moves the remote controller 200 away from the display 180. Then, a selection area corresponding to the pointer 205 may be zoomed in and enlarged on the display 180. On the contrary, if the user moves the remote controller 200 toward the display 180, the selection area corresponding to the pointer 205 is zoomed out and thus contracted on the display 180. Alternatively, when the remote controller 200 moves away from the display 180, the selection area may be zoomed out and when the remote controller 200 approaches the display 180, the selection area may be zoomed in.

With the predetermined button pressed in the remote controller 200, the up, down, left and right movements of the remote controller 200 may be ignored. That is, when the remote controller 200 moves away from or approaches the display 180, only the back and forth movements of the remote controller 200 are sensed, while the up, down, left and right movements of the remote controller 200 are ignored. Unless the predetermined button is pressed in the remote controller 200, the pointer 205 moves in accordance with the up, down, left or right movement of the remote controller 200.

The speed and direction of the pointer 205 may correspond to the speed and direction of the remote controller 200.

Figure 4:
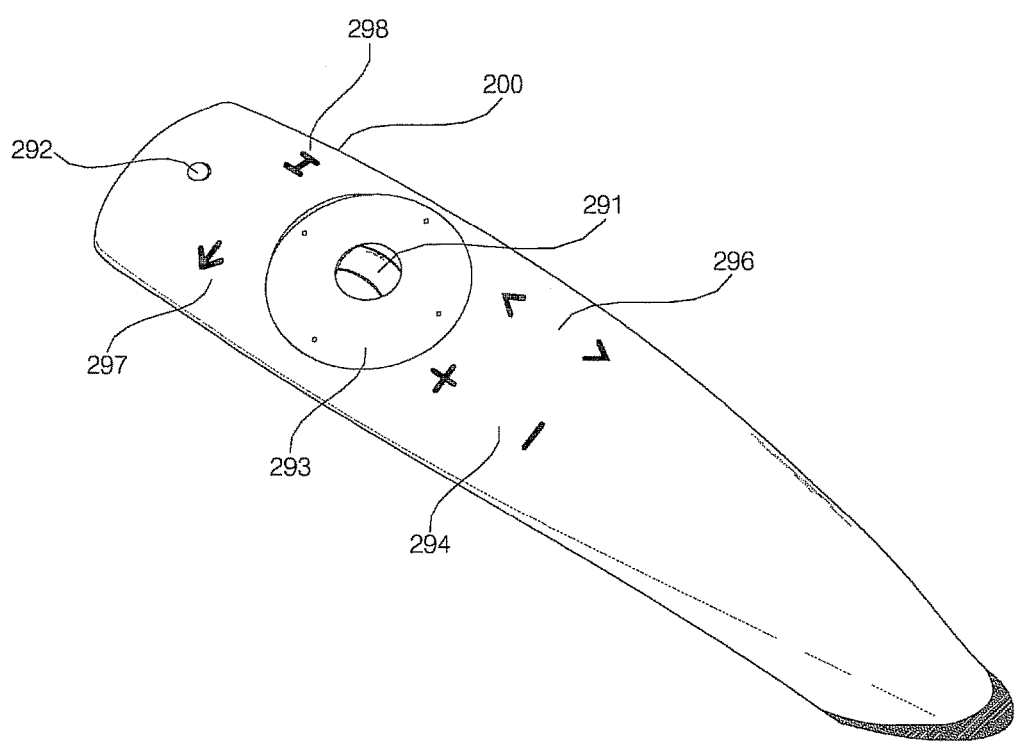
FIG. 4 is a perspective view of a remote controller according to an embodiment of the present invention.
Figure 5:
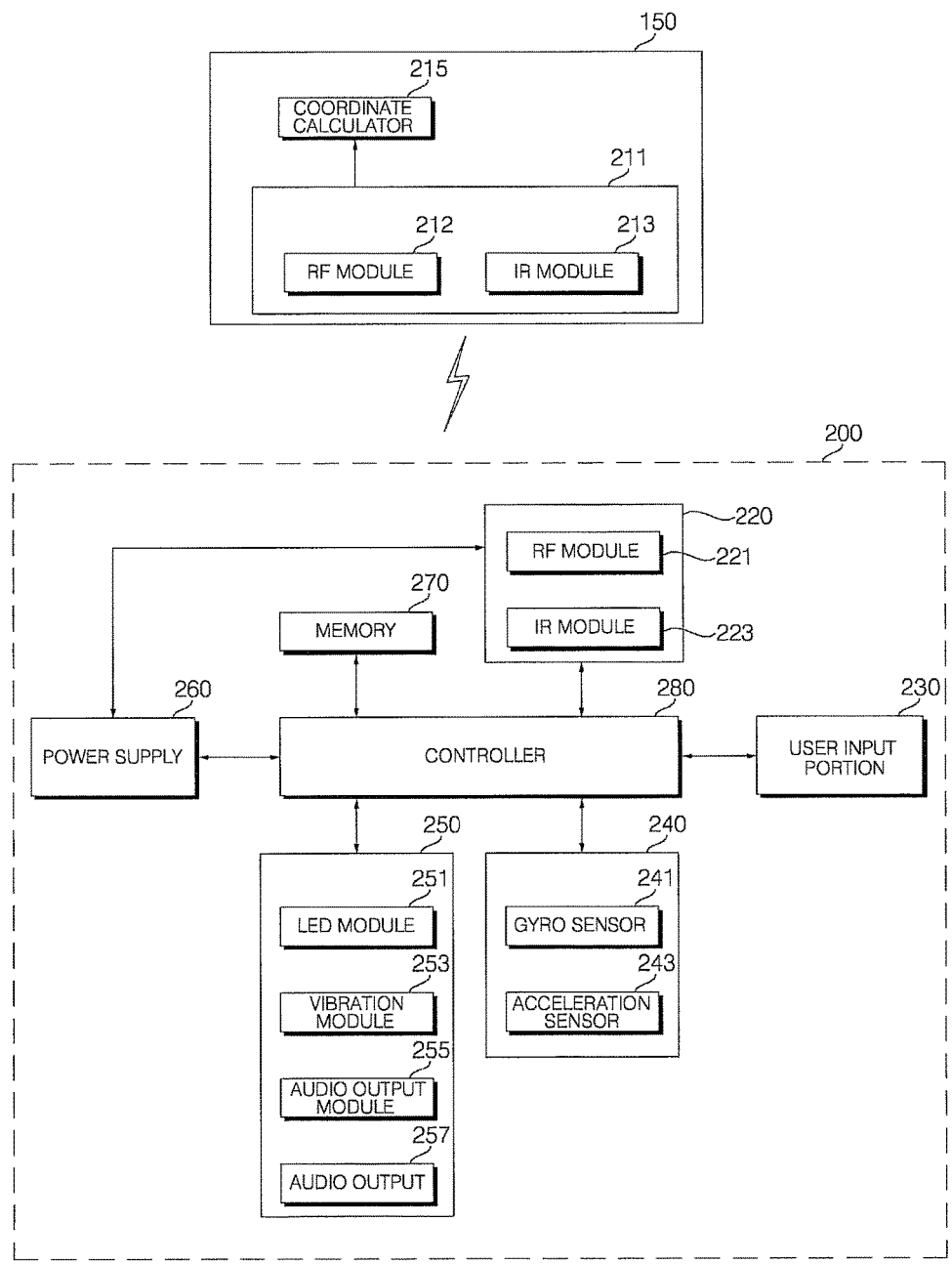
FIG. 5 is a block diagram showing the internal configuration of a remote controller according to an embodiment of the present invention.

FIG. 4 is a perspective view of a remote controller according to an embodiment of the present invention and FIG. 5 is a block diagram showing the internal configuration of a remote controller according to an embodiment of the present invention.

Referring to FIG. 4, the pointing device 201 according to the embodiment of the present invention may include various input keys, input buttons, etc.

For example, the pointing device 201 may include an okay key 291, a menu key 292, a 4-direction key 293, a channel control key 294, and a volume control key 296.

For example, the okay key 291 may be used to select a menu or item, the menu key 292 may be used to display a predetermined menu, the 4-direction key 294 may be used to move a pointer or indicator up, down, left and right, the channel control key 294 may be used to move a channel up or down, and the volume control key 296 may be used for volume control.

The pointing device 201 may further include a back key 297 and a home key 298. For example, the back key 297 may be used to move a screen to a previous screen and the home key 298 may be used to move a screen to a home screen.

As shown in FIG. 4, the okay key 291 may further include a scroll function. For the scroll function, the okay key 291 may be implemented as a wheel key. That is, if the okay key 291 is pushed, the okay key 291 is used to select a menu or item and, if the okay key 291 is scrolled up or down, the okay key 291 is used to scroll a display screen or switch a list page.

More specifically, when the okay key 291 is scrolled for image searching in a state in which an image having a size greater than the size of the display is displayed on the display 180, an image region which is not currently displayed is displayed on the display. As another example, if the okay key 291 is scrolled in a state in which a list page is displayed on the display 180, a previous page or a next page of a current page may be displayed.

Such a scroll function may be included separately from the okay key 291.

The four-direction key 293 may include up, down, left and right keys in a circular shape as shown in FIG. 4. Touch input using the four-direction key 293 may be possible. For example, if a touch operation from the up key to the down key in the four-direction key 293 is performed, a set function may be input or performed according to the touch input.

Referring to FIG. 5, the remote controller 200 may include a radio transceiver 220, a user input portion 230, a sensor portion 240, an output portion 250, a power supply 260, a memory 270, and a controller 280.

The radio transceiver 220 transmits and receives signals to and from any one of the image display devices according to the embodiments of the present invention. Among the image display apparatuses according to the embodiments of the present invention, for example, one image display apparatus 100 will be described.

In accordance with the exemplary embodiment of the present invention, the remote controller 200 may be provided with an RF module 221 for transmitting and receiving signals to and from the image display device 100 according to an RF communication standard. Also, the remote controller 200 may include an IR module 223 for transmitting and receiving signals to and from the image display device 100 according to an IR communication standard.

In addition, the remote controller 200 may further include an NFC module (not shown) for NFC with an electronic apparatus.

The remote controller 200 may transmit information about movement of the remote controller 200 to the image display apparatus 100 via the RF module 221.

The remote controller 200 may receive the signal from the image display apparatus 100 via the RF module 221. The remote controller 200 may transmit commands associated with power on/off, channel switching, volume change, etc. to the image display device 100 through the IR module 223.

According to the present embodiment, the remote controller 200 may receive personal information by NFC with a predetermined electronic apparatus.

The remote controller 200 may transmit the received personal information to the image display apparatus 100. At this time, an IR method or an RF method may be used as a communication method.

The remote controller 200 may further receive information about a web server which is being accessed using the personal information, in addition to the personal information. For example, the remote controller 200 may receive web server information of a social network service which is being logged in and accessed by the mobile terminal 300. Such web server information may also be transmitted to the image display apparatus 100.

The remote controller 200 may receive apparatus information of another electronic apparatus or remote controllable channel information, frequency information or code information of another electronic apparatus. Based on the information about another electronic apparatus, a channel, frequency or code may be allocated to the electronic apparatus so as to perform remote control.

The user input portion 230 may include a keypad, a key (button), a touch pad or a touchscreen. The user may enter a command related to the image display device 100 to the remote controller 200 by manipulating the user input portion 230. If the user input portion 230 includes hard keys, the user may enter commands related to the image display device 100 to the remote controller 200 by pushing the hard keys. If the user input portion 230 is provided with a touchscreen, the user may enter commands related to the image display device 100 to the remote controller 200 by touching soft keys on the touchscreen. Also, the user input portion 230 may have a variety of input means which may be manipulated by the user, such as a scroll key, a jog key, etc., to which the present invention is not limited.

The sensor portion 240 may include a gyroscopic sensor 241 or an acceleration sensor 243. The gyroscopic sensor 241 may sense information about movement of the remote controller 200.

For example, the gyroscopic sensor 241 may sense information about movement of the remote controller 200 along x, y and z axes. The acceleration sensor 243 may sense information about the velocity of the remote controller 200. The sensor portion 240 may further include a distance measurement sensor for sensing a distance from the display 180. Alternatively, the sensor portion 240 may include a geomagnetic sensor for detecting flow of a magnetic field generated by earth and detecting a compass bearing to detect change in the compass bearing.

The output portion 250 may output a video or audio signal corresponding to manipulation of the user input portion 230 or a signal transmitted by the image display device 100. The user may be aware from the output portion 250 whether the user input portion 230 has been manipulated or the image display device 100 has been controlled.

For example, the output portion 250 may include a Light Emitting Diode (LED) module 251 for illuminating when the user input portion 230 has been manipulated or a signal is transmitted to or received from the image display device 100 through the radio transceiver 220, a vibration module 253 for generating vibrations, an audio output module 255 for outputting audio, or a display module 257 for outputting video.

The power supply 260 supplies power to the remote controller 200. When the remote controller 200 is kept stationary for a predetermined time, the power supply 260 blocks power from the remote controller 200, thereby preventing waste of power. When a predetermined key of the remote controller 200 is manipulated, the power supply 260 may resume power supply.

The memory 270 may store a plurality of types of programs required for control or operation of the remote controller 200, or application data. When the remote controller 200 transmits and receives signals to and from the image display device 100 wirelessly through the RF module 221, the remote controller 200 and the image display device 100 perform signal transmission and reception in a predetermined frequency band. The controller 280 of the remote controller 200 may store information about the frequency band in which to wirelessly transmit and receive signals to and from the image display device 100 paired with the remote controller 200 in the memory 270 and refer to the information.

The memory 270 may store IR format key codes for controlling other electronic apparatuses as IR signals and store an IR format key database of a plurality of electronic apparatuses.

The controller 280 provides overall control to the remote controller 200. The controller 280 may transmit a signal corresponding to predetermined key manipulation on the user input portion 230 or a signal corresponding to an movement of the remote controller 200 sensed by the sensor portion 240 to the image display device 100 through the radio transceiver 220.

The controller 280 may control transmission of the received personal information to the image display apparatus 100 through the radio transceiver 220 by NFC with an electronic apparatus. In particular, if predetermined key input of the user input portion 230 is performed, the controller 280 may control transmission of the received personal information to the image display apparatus 100 through the radio transceiver 220.

In addition, the controller 280 may control transmission of the received personal information to an electronic apparatus other than the image display apparatus 100. At this time, different channels, frequencies or codes may be used with respect to electronic apparatuses. Such channels, frequencies or codes may be based on apparatus information or remote controllable channel information, frequency information or code information previously received from another electronic apparatus.

The user input interface 150 of the image display device 100 may have a radio transceiver 211 for wirelessly transmitting and receiving signals to and from the remote controller 200, and a coordinate calculator 215 for calculating the coordinates of the pointer corresponding to an operation of the remote controller 200.

The user input interface 150 may transmit and receive signals wirelessly to and from the remote controller 200 through an RF module 212. The user input interface 150 may also receive a signal from the remote controller 200 through an IR module 213 based on the IR communication standard.

The coordinate calculator 215 may calculate the coordinates (x, y) of the pointer to be displayed on the display 180 by correcting handshaking or errors from a signal corresponding to an operation of the remote controller 200 received through the radio transceiver 211.

A signal transmitted from the remote controller 200 to the image display apparatus 100 through the user input interface 150 is provided to the controller 180 of the image display device 100. The controller 180 may identify information about an operation of the remote controller 200 or key manipulation on the remote controller 200 from the signal received from the remote controller 200 and control the image display device 100 according to the information.

In another example, the remote controller 200 may calculate the coordinates of the pointer corresponding to the operation of the remote controller and output the coordinates to the user input interface 150 of the image display device 100. The user input interface 150 of the image display device 100 may then transmit information about the received coordinates to the controller 180 without correcting handshaking or errors.

As another example, the coordinate calculator 215 may not be included in the user input interface 150 but may be included in the controller 170.

Figure 6:
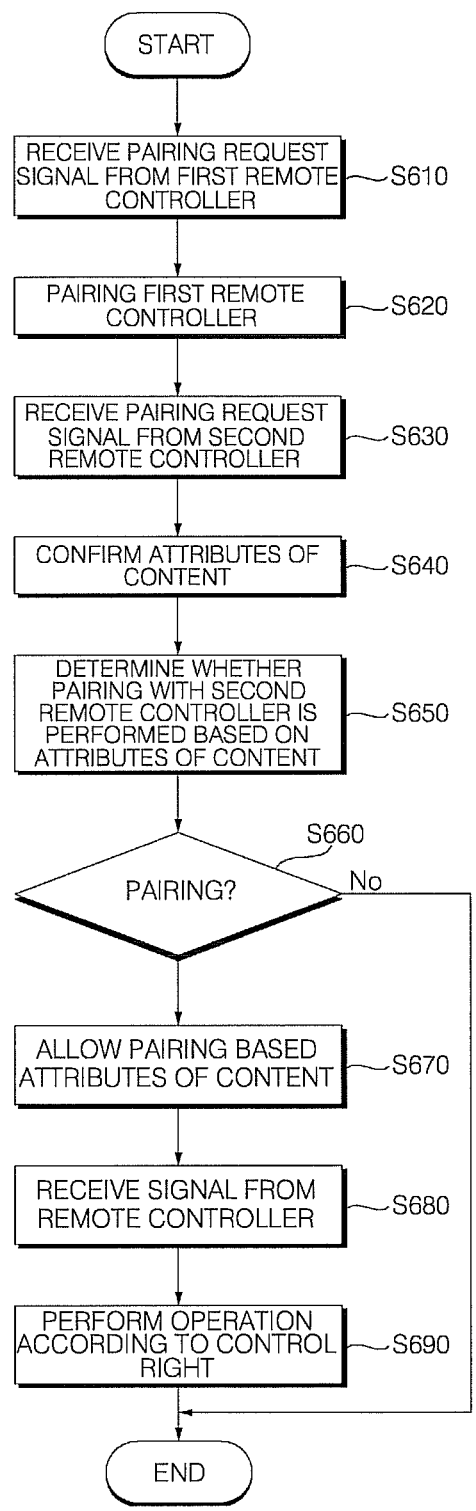
FIG. 6 is a flowchart illustrating a method for operating an image display apparatus according to an embodiment of the present invention.

FIG. 6 is a flowchart illustrating a method for operating an image display apparatus according to an embodiment of the present invention, and FIGS. 7 to 15 are views referred to for describing various examples of the method for operating the image display apparatus according to various embodiments of the present invention.

Referring to the figures, the interface 150 of the image display apparatus 100 may receive a pairing request signal from the first remote controller 201 (S610) and may perform pairing with the first remote controller (S620).

Hereinafter, an embodiment of step S610 of receiving the pairing request signal and step S620 of performing pairing will be described in greater detail.

The first remote controller 201 and the image display apparatus 100 may transmit and receive a signal to and from each other through a frequency channel for management. Information about the frequency channel for management may be stored in the memory 270 of the first remote controller 201 or the memory 140 of the image display device 100.

The first remote controller 201 may refer to the information about the frequency channel for management stored in the memory 270 and request pairing from the image display apparatus 100 using the frequency channel for management according to the information. If the frequency channel for management is used, the first remote controller 201 may transmit and receive a signal according to an RF communication protocol to and from the image display apparatus 100 before pairing.

If the first remote controller 201 is reset, if a user manipulates a pairing request button, for example, an OK button, or if a power-on command of the image display apparatus 100 is input to the first remote controller 201, the first remote controller 201 may transmit a signal including a pairing request packet to the image display apparatus 100.

The controller 280 of the first remote controller 201 may transmit the pairing request signal to the image display apparatus 100 through the RF module 221 of the radio transceiver 220 by referring to the information about the frequency channel for management stored in the memory 270.

The image display apparatus 100 may receive the pairing request packet transmitted by the first remote controller 201 through the RF module 221 of the radio transceiver 220 of the image display apparatus. The image display apparatus 100 may transmit a signal including information about a frequency channel for pairing to the first remote controller 201 in response to the received pairing request packet.

The first remote controller 201 may receive the information about the frequency channel for pairing transmitted by the image display apparatus 100 through the RF module 221 of the radio transceiver 220 and scan the frequency channel included in the transmitted frequency channel information.

The first remote controller 201 selects an optimal frequency channel obtained as the scanning result as the frequency channel for pairing. The optimal frequency channel may be a frequency channel capable of best receiving data or a frequency channel having highest power. In addition, the first remote controller 201 may select a frequency channel which is not used in another remote controller as the frequency channel for pairing. In addition, the first remote controller 201 may set a frequency channel having lowest noise or interference as the frequency channel for pairing.

The first remote controller 201 transmits the information about the selected channel to the image display apparatus 100. The image display apparatus 100 selects the frequency channel for pairing according to the received channel information and finishes pairing between the first remote controller 201 and the image display apparatus 100.

Thereafter, if a predetermined button or key of the user input unit 230 is manipulated or if the first remote controller 201 is moved, the controller 280 of the paired first remote controller 201 may transmit a signal corresponding to manipulation of the predetermined button or key or movement of the first remote controller to the image display apparatus 100 through the RF module 221. The image display apparatus 100 may grant a control right to the paired first remote controller 201 and perform corresponding operation based on the signal received from the first remote controller 201.

In the present specification, the image display apparatus 100 granting the control right to the predetermined remote controller 200 means that the image display apparatus operates based on a signal received from the remote controller 200 to which the control right is granted and ignores a signal received from a remote controller 200 to which the control right is not granted and does not operate according to the signal.

While pairing with the first remote controller 201 has been performed or is being performed, the pairing request signal may be received from a second remote controller 202 (S630).

The controller 170 of the image display apparatus 100 confirms the attributes of content which is being used in response to receipt of the pairing request signal (S640) and determines whether pairing with the second remote controller is performed based on the confirmed attributes of the content (S650).

For example, if game content is currently used through the image display apparatus 100, a plurality of remote controllers may be required and thus the controller 170 determines that pairing with the second remote controller is performed.

Referring to FIG. 7, predetermined game content, e.g., a shooting game, may be used through the image display apparatus 100. In this case, a first player may control a screen 710 and a gun 711 using the first remote controller 201. If the shooting game is content which may be used by a plurality of players, the game may be played when a second player performs pairing or manipulation of the second remote controller 202. The first and second remote controller 201 and 202 may control different objects 721 and 722 on a screen 720.

Accordingly, a remote controller which is being manipulated is registered and used as the first player and then subsequently manipulated remote controllers are registered and used as the second and third players.

Alternatively, if a specific user logs in to the image display apparatus 100 so as to use a personalized service such as a social network service, the controller 170 determines that pairing with the second remote controller is not performed.

As shown in FIG. 8, if a security function or service such as password settings 810 is used, only one remote controller, e.g., the first remote controller 201, may be set to be manipulated.

Alternatively, as shown in FIG. 9, the first and second remote controllers 201 and 202 may be set to perform basic manipulation such as channel change or volume change.

Pairing with the second remote controller may be performed based on the confirmed attributes of the content (S660). In this case, according to embodiments, a step of displaying pairing progress information of the second remote controller on the display 180 may be further included.

In addition, a step of displaying one or two pointers on the display 180 based on the confirmed attributes of the content may be further included.

If pairing with the second remote controller is also performed (S660), the controller 170 may grant a control right to at least one of the first remote controller and the second remote controller based on the confirmed attributes of the content (S670).

The controller 170 may grant a control right to the first remote controller or the second remote controller according to content attributes such that the image display apparatus 100 is controlled using only one remote controller in at least a specific situation.

Alternatively, the controller 170 may grant a control right to both the first remote controller and the second remote controller. In this case, according to embodiments, priority is given to any one of the first remote controller and the second remote controller such that a command of a remote controller with high priority is executed first.

When a signal is received from at least one remote controller (S680) in a state in which pairing with the first remote controller 201 and the second remote controller 202 is performed, the controller 170 may control to perform operation based on a signal of a predetermined remote controller according to the control right (S690).

In step S690 of performing operation according to the control right, operation may be variously performed according to control right, priority or user or manufacturer settings.

For example, the method for operating the image display apparatus according to one embodiment of the present invention may further include performing operation corresponding to operation of the first remote controller if the first remote controller is operating. That is, the controller 170 may control preferential execution of a command received from the remote controller which is being manipulated.

In this case, after operation of the first remote controller is finished, a step of receiving a signal from the first remote controller or the second remote controller and a step of performing operation based on the signal received from the first remote controller or the second remote controller may be further included. The controller 170 may control performance of operation corresponding to the first input signal of the remote controller after operation of the first remote controller is finished.

In addition, if the display of the pointer is finished as operation of the first remote controller is finished and a signal is received from the first remote controller or the second remote controller, a step of displaying the pointer again may be further included. The controller 170 may control performance of operation corresponding to the first input signal of the remote controller after operation of the first remote controller is finished.

Alternatively, the method for operating the image display apparatus according to one embodiment of the present invention may further include a step of performing operation corresponding to only the signal received from any one remote controller according to predetermined priority if, in a state in which any one of the paired first and second remote controllers is operating, the other remote controller operates. The controller 170 may control operation corresponding to the signal received from any one remote controller to be performed according to predetermined priority and control the signal received from the other remote controller to be ignored.

The method for operating the image display apparatus according to one embodiment of the present invention may further include a step of releasing pairing with the first remote controller based on the confirmed attributes of the content. The controller 170 may determine that pairing with the second remote controller is not performed if the confirmed content allows only one remote controller. Alternatively, the controller 170 may control pairing with the first remote controller to be released if it is determined that pairing with the second remote controller for newly requesting pairing is performed.

The method for operating the image display apparatus according to one embodiment of the present invention may further include a step of displaying a first pointer in correspondence with pairing with the first remote controller.

In this case, a step of performing pairing with the second remote controller and a step of moving the first pointer in correspondence with motion of at least one of the first remote controller and the second controller may be further included.

Alternatively, a step of performing pairing with the second remote controller, a step of displaying a second pointer according to pairing with the second remote controller, and a step of moving the first pointer in correspondence with motion of the first remote controller and moving the second pointer in correspondence with motion of the second remote controller may be further included. The controller 170 may control the first pointer and the second pointer to have different display states.

Figure 10A:
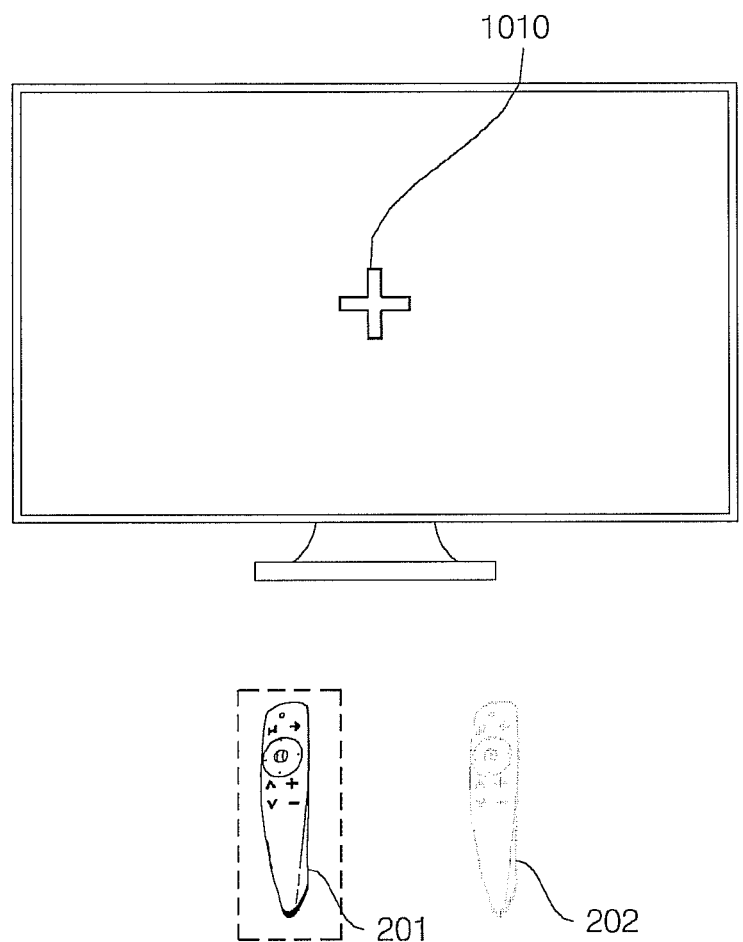
Figure 10B:
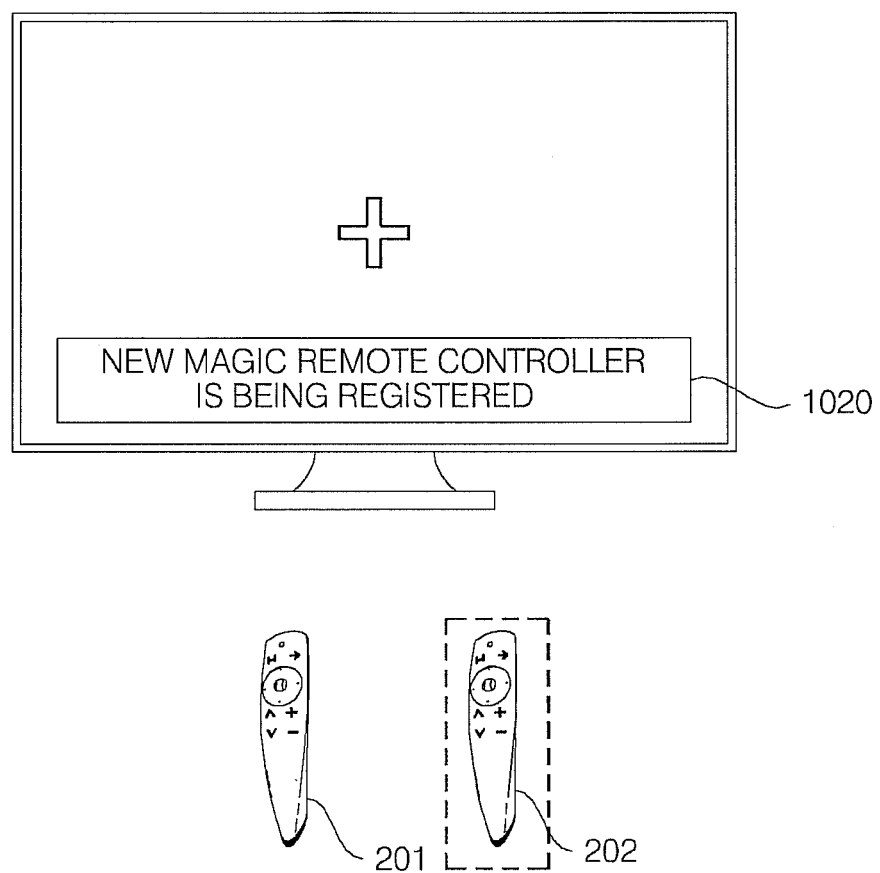
Figure 10C:
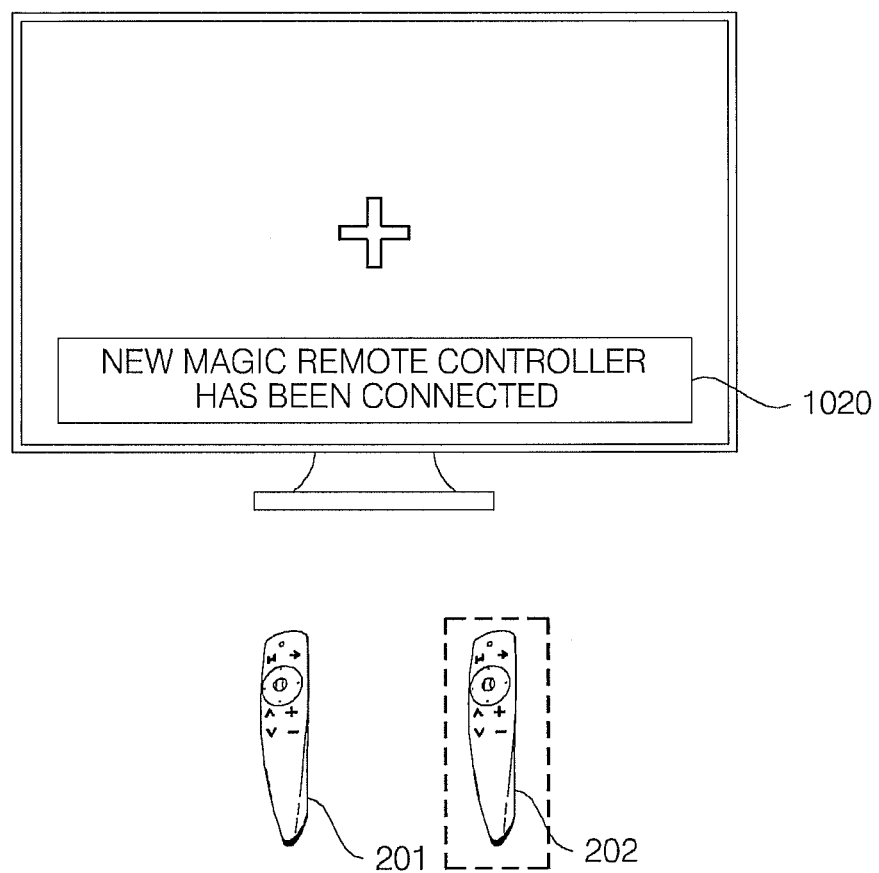

FIGS. 10a to 10c show one of embodiments in which only one remote controller operates.

Referring to FIGS. 10a to 10c, a first user may control the image display apparatus 100 using the paired first remote controller 201. For example, the first user may control a pointer 1010 displayed in correspondence with motion of the first remote controller 201 using the first remote controller 201.

A dotted line surrounding the remote controller in the figures of the present specification means a remote controller which is operating.

Thereafter, if the first user or a second user manipulates a predetermined key, e.g., an "OK" key, corresponding to a request for pairing with the second controller 202, the controller 170 may determine whether pairing with the second remote controller 202 is performed according to content attributes.

If it is determined that pairing with the second remote controller 202 is performed, pairing progress information 1020 and 1030 indicating that pairing with the second remote controller is being performed or has been performed may be displayed on the display 180.

In the embodiment of FIGS. 10a to 10c, the newly registered remote controller, e.g., the second remote controller 202, is preferred over the first remote controller 201. Accordingly, it is possible to control the image display apparatus 100 or the pointer 1010 using the newly paired second remote controller 202.

Figure 11A:
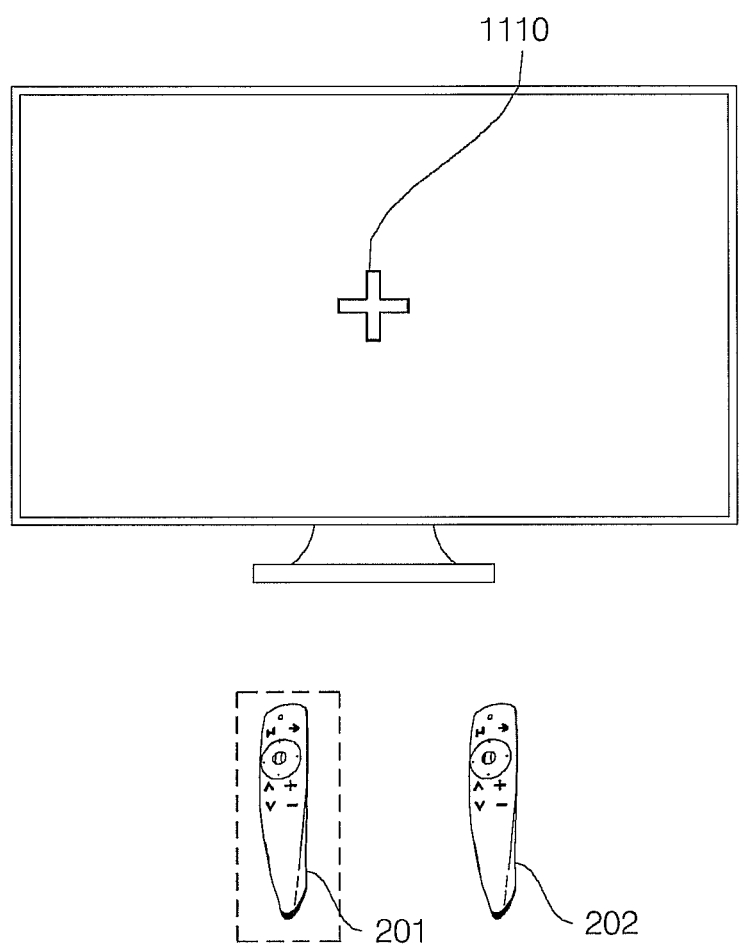

FIGS. 11a to 11c show one of embodiments in which only one remote controller operates. More specifically, FIGS. 11a to 11c show an embodiment in which the remote controller operates in a state in which priority is given to a newly input signal.

As shown in FIG. 11a, if a predetermined signal is received from the second remote controller 202 through the interface 150 while the first remote controller 201 is operating, that is, while the pointer 110 is moved using the first remote controller 201, the controller 170 may control operation of the first remote controller 201 to be finished and control performance of operation corresponding to the signal received from the second remote controller 202 as shown in FIG. 11b.

As shown in FIG. 11c, when the predetermined signal is received from the first remote controller 201, the controller 170 may control operation of the second remote controller 202 to be finished and control performance of operation corresponding to the signal received from the first remote controller 201.

Figure 12A:
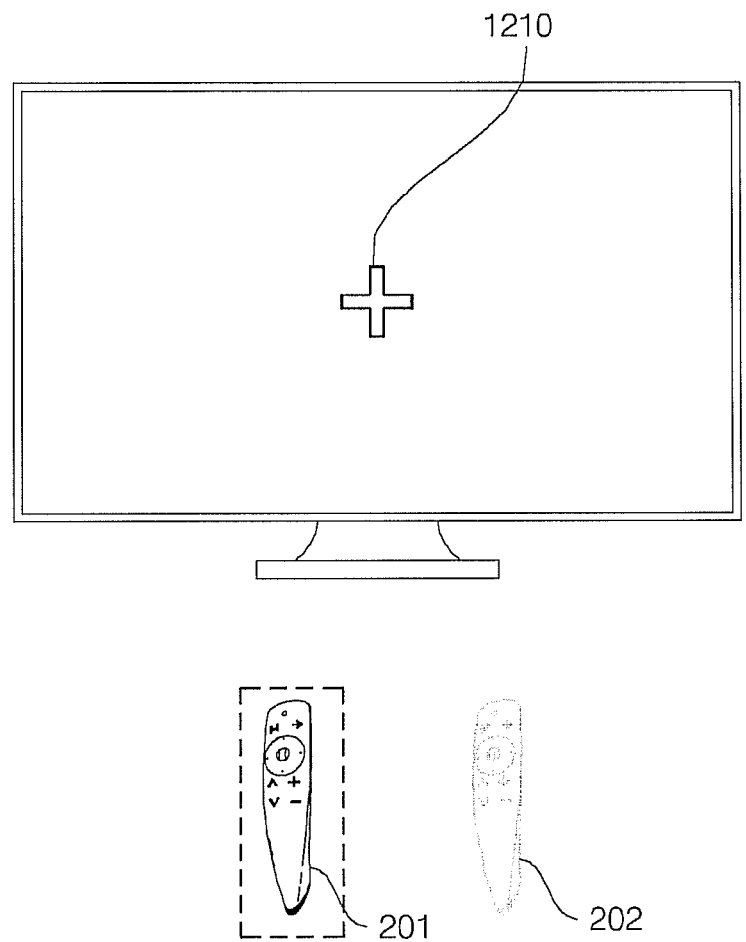
Figure 12B:
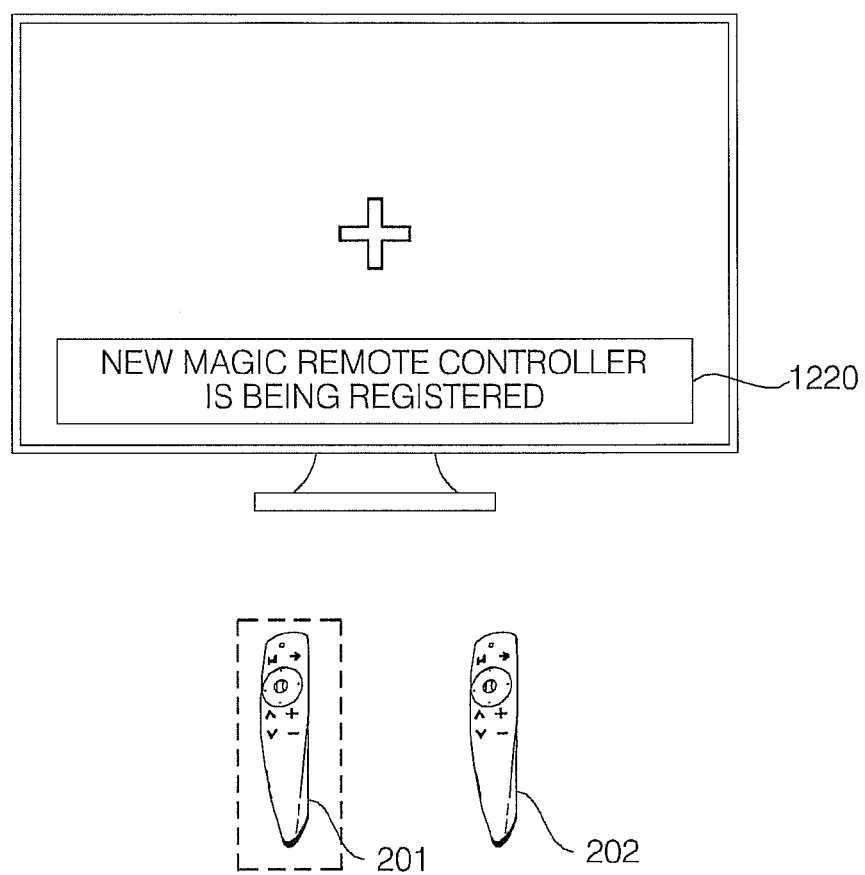

FIGS. 12a to 12c show one of embodiments in which only one remote controller operates.

Referring to FIGS. 12a to 12c, a first user may control the image display apparatus 100 using the paired first remote controller 201. For example, the first user may control the pointer 1210 displayed in correspondence with motion of the first remote controller 201 using the first remote controller 201.

If the first user or the second user manipulates a predetermined key, e.g., an "OK" key, corresponding to a request for pairing with the second remote controller 202, the controller 170 may determine whether pairing with the second remote controller 202 is performed according to content attributes.

If it is determined that pairing with the second remote controller 202 is performed, the display 180 may display pairing progress information 1220 and 1230 indicating that pairing with the second remote controller is being performed or has been performed may be displayed on the display 180.

In the embodiment of FIGS. 10a to 10c, the newly registered remote controller, e.g., the second remote controller 202, is preferred over the first remote controller 201.

However, in the embodiment of FIGS. 12a to 12c, the previously registered remote controller, that is, the first remote controller 201 may be preferred over the second remote controller 202. Therefore, after pairing with the second remote controller 202 is finished, it is possible to control the image display apparatus 100 or the pointer 1210 using the previously paired first remote controller 201.

Even after operation of the first remote controller 201 is finished, the image display apparatus 100 may operate in correspondence with any newly operated remote controller.

Referring to FIGS. 13a to 13d, the display of the pointer may be finished as operation of the first remote controller is finished and the pointer may be displayed again if a signal is received from the first remote controller or the second remote controller.

Figure 13A:
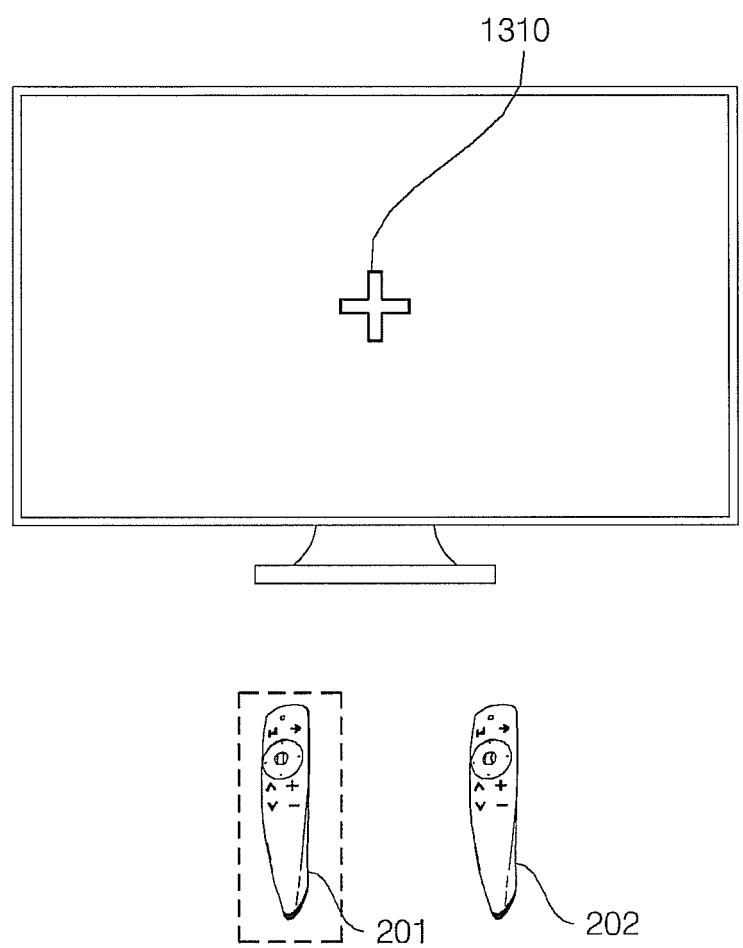
Figure 13B:
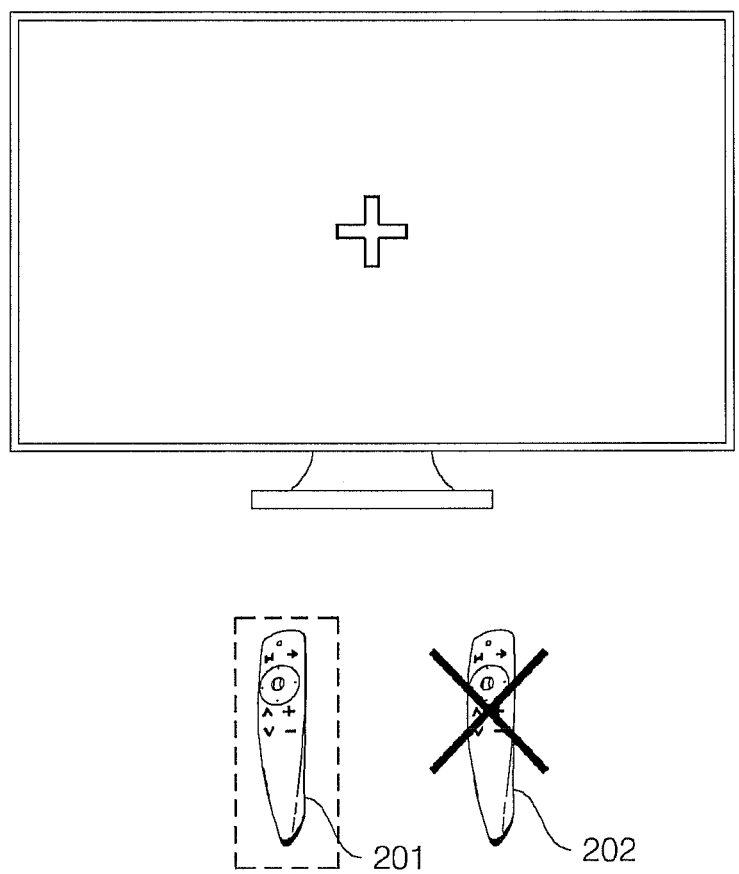

First, as shown in FIG. 13a, if a predetermined signal is received from the second remote controller 202 through the interface 150 while the first remote controller 201 is operating, that is, while the pointer 130 is moved using the first remote controller 201, the controller 170 may control operation of the first remote controller 201 to be maintained and control operation corresponding to the signal received from the second remote controller 202 to be ignored as shown in FIG. 13b.

Figure 13C:
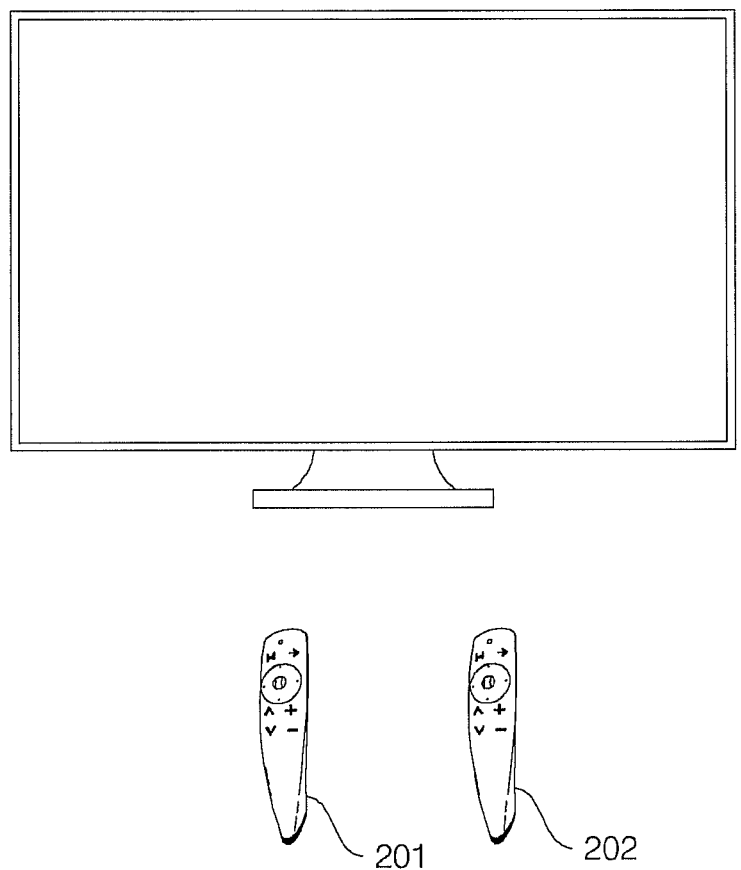

Then, if operation of the first remote controller 201 is finished, the display of the pointer may be finished and hidden from the screen as shown in FIG. 13c. Accordingly, the user may be intuitively aware that the image display apparatus may be controlled using any remote controller.

As shown in FIG. 13d, if a signal is received from the first remote controller or the second remote controller, the controller 170 may display the pointer again and control performance of operation corresponding thereto.

FIGS. 14 and 15 show an example in which two points are displayed according to pairing with the first and second remote controller 201 and 202 and one pointer is controlled using the first and second remote controllers 201 and 202.

Referring to FIGS. 14 and 15, a first pointer 1410 may be displayed on the display 180 in correspondence with pairing with the first remote controller 201 and a second pointer 1420 may be displayed on the display 180 in correspondence with pairing with the second remote controller 202. In this case, the first pointer 1410 may be moved in correspondence with motion of the first remote controller 201 and the second pointer 1420 may be moved in correspondence with motion of the second remote controller 202.

As shown in FIG. 15, the first pointer 1510 and the second pointer 1520 may have different display states. The controller 170 may control the first pointer 1510 and the second pointer 1520 to be differently displayed in terms of at least one of the shape, the size and the color or control the first pointer 1510 and the second pointer 1520 to have predetermined identification marks.

According to the embodiments of the present invention, it is possible to determine whether pairing with a plurality of remote controllers is performed according to content attributes and to grant a control right to at least one of the plurality of remote controllers. Accordingly, it is possible to increase user convenience by variously and conveniently using the plurality of remote controllers according to content.

The method for operating an image display apparatus according to the foregoing embodiments may be implemented as code that can be written to a computer-readable recording medium and can thus be read by a processor. The computer-readable recording medium may be any type of recording device in which data can be stored in a computer-readable manner. Examples of the computer-readable recording medium include a ROM, a RAM, a CD-ROM, a magnetic tape, a floppy disk, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Functional programs, code, and code segments needed for realizing the embodiments herein can be construed by one of ordinary skill in the art.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for operating an image display apparatus, the method comprising:

displaying a prescribed content on the image display apparatus;

receiving a pairing request signal from a first remote controller;

performing pairing with the first remote controller;

receiving a pairing request signal from a second remote controller;

confirming attributes of the prescribed content which is displayed;

determining whether pairing with the second remote controller is performed based on the confirmed attributes of the displayed prescribed content;

performing pairing with the second remote controller when the confirmed attributes of the displayed prescribed content allows use of a plurality of remote controllers, and displaying one or two pointers corresponding to the paired first and second remote controllers based on the confirmed attributes of the displayed prescribed content after pairing with the second remote controller is performed, wherein, when the confirmed attributes of the displayed prescribed content allows pairing of a plurality of remote controllers, displaying a pointer for each of the first and second remote controllers for display together with the prescribed content;

wherein a movement of a first pointer over the displayed prescribed content is controlled based on a RF signal corresponding to a motion of the first remote controller and a movement of a second pointer on the displayed prescribed content is controlled based on a RF signal corresponding to a motion of the second remote controller, and wherein the first pointer and the second pointer have different display states.

2. The method according to claim 1, further comprising granting a control right to at least one of the first remote controller or the second remote controller based on the confirmed attributes of the prescribed content.

3. The method according to claim 1, further comprising performing pairing with the second remote controller based on the confirmed attributes of the prescribed content.

4. The method according to claim 3, further comprising displaying pairing progress information of the second remote controller on a display.

5. The method according to claim 3, further comprising performing operation corresponding to operation of the first remote controller if the first remote controller is operating.

6. The method according to claim 5, further comprising:

receiving a signal from the first remote controller or the second remote controller after operation of the first remote controller is finished; and performing operation based on the signal received from the first remote controller or the second remote controller.

7. The method according to claim 6, further comprising finishing the display of the first pointer as operation of the first remote controller is finished and displaying the first pointer again if a signal is received from the first remote controller.

8. The method according to claim 3, further comprising performing operation corresponding to only a signal received from any one remote controller according to predetermined priority if, in a state of operating any one of the paired first and second remote controllers, the other remote controller operates.

9. The method according to claim 1, further comprising releasing pairing with the first remote controller based on the confirmed attributes of the prescribed content.

10. The method according to claim 1, further comprising:
performing pairing with the second remote controller; and
moving the first pointer in correspondence with motion of at least one of the first remote controller and the second remote controller.

11. An image display apparatus comprising:
an interface configured to receive a pairing request signal from a remote controller;
a display configured to display a prescribed content; and
a controller configured to receive a pairing request signal from a second remote controller in a state of performing pairing with a first remote controller, determine whether pairing with the second remote controller is performed based on the confirmed attributes of the displayed prescribed content, and perform pairing with the second remote controller when the confirmed attributes of the displayed prescribed content allows use of a plurality of remote controllers,
wherein the controller controls one or two pointers on the display corresponding to the paired first and second remote controllers based on the attributes of the displayed prescribed content after pairing with the second remote controller is performed,
wherein, when the confirmed attributes of the displayed prescribed content allows pairing of a plurality of remote controllers, displaying a pointer for each of the first and second remote controllers for display together with the prescribed content;
wherein a movement of a first pointer over the displayed prescribed content is controlled based on a RF signal corresponding to a motion of the first remote controller and a movement of a second pointer on the displayed prescribed content is controlled based on a RF signal corresponding to a motion of the second remote controller, and
wherein if two pointers are displayed, the controller controls the two pointers to be displayed differently.

12. The image display apparatus according to claim 11, wherein the controller grants a control right to at least one of the first remote controller or the second remote controller based on the attributes of the prescribed content.

13. The image display apparatus according to claim 11, wherein the controller controls pairing with the second remote controller based on the attributes of the prescribed content.

14. The image display apparatus according to claim 13, wherein the controller controls display of pairing progress information of the second remote controller on the display.

* * * * *